US012218793B2

(12) United States Patent
Li

(10) Patent No.: US 12,218,793 B2
(45) Date of Patent: Feb. 4, 2025

(54) ALARM METHOD AND APPARATUS

(71) Applicant: Huawei Technologies Co., Ltd., Shenzhen (CN)

(72) Inventor: Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 506 days.

(21) Appl. No.: 17/122,431

(22) Filed: Dec. 15, 2020

(65) Prior Publication Data

US 2021/0099335 A1    Apr. 1, 2021

Related U.S. Application Data

(63) Continuation of application No. PCT/CN2019/090525, filed on Jun. 10, 2019.

(30) Foreign Application Priority Data

Jun. 15, 2018    (CN) .......................... 201810621708.7

(51) Int. Cl.
*H04L 41/0604* (2022.01)
*G06F 9/455* (2018.01)
*H04L 41/5041* (2022.01)

(52) U.S. Cl.
CPC ...... *H04L 41/0627* (2013.01); *G06F 9/45558* (2013.01); *H04L 41/0618* (2013.01); *H04L 41/5041* (2013.01); *G06F 2009/45595* (2013.01)

(58) Field of Classification Search
None
See application file for complete search history.

(56) References Cited

U.S. PATENT DOCUMENTS

2017/0141973 A1* 5/2017 Vrzic .................... H04W 76/11
2017/0331884 A1   11/2017 Colle et al.
(Continued)

FOREIGN PATENT DOCUMENTS

CN    105337758 A    2/2016
CN    105847025 A    8/2016
(Continued)

OTHER PUBLICATIONS

3GPP TR 28.801 V15.1.0, "3rd Generation Partnership Project; Technical Specification Group Services and System Aspects; Telecommunication management; Study on management and orchestration of network slicing for next generation netwo (Release 15)," Jan. 2018, 75 pages.
(Continued)

*Primary Examiner* — William G Trost, IV
*Assistant Examiner* — Christopher P Cadorna
(74) *Attorney, Agent, or Firm* — Conley Rose, P.C.

(57) ABSTRACT

A method includes: sending, by a first service entity, a first request to a second service entity, where the first service entity is configured to manage a network slice instance, and the second service entity is configured to manage an alarm of a network function instance, where the first request includes identifier information of a VNF instance; the first request is used to request a virtualized resource alarm carrying the identifier information; and there is a correspondence between the VNF instance and a first network slice instance managed by the first service entity; and receiving, by the first service entity, a first response from the second service entity, where the first response carries the virtualized resource alarm.

20 Claims, 11 Drawing Sheets

(56) References Cited

U.S. PATENT DOCUMENTS

| | | | |
|---|---|---|---|
| 2017/0346676 A1* | 11/2017 | Andrianov | H04L 41/069 |
| 2018/0026833 A1 | 1/2018 | Zhu et al. | |
| 2018/0132117 A1 | 5/2018 | Senarath et al. | |
| 2019/0199582 A1* | 6/2019 | Liu | G06F 9/45558 |
| 2019/0261184 A1 | 8/2019 | Xu et al. | |
| 2020/0014584 A1* | 1/2020 | Rauschenbach | H04L 41/40 |
| 2020/0382386 A1* | 12/2020 | Narendra | H04L 43/0817 |
| 2021/0226838 A1* | 7/2021 | Hegarty | H04L 65/1069 |
| 2021/0288888 A1* | 9/2021 | Daidone | H04L 41/5058 |

FOREIGN PATENT DOCUMENTS

| | | |
|---|---|---|
| CN | 106506201 A | 3/2017 |
| CN | 107005428 A | 8/2017 |
| CN | 107113195 A | 8/2017 |
| CN | 108023749 A | 5/2018 |
| CN | 108024270 A | 5/2018 |
| CN | 108293004 A | 7/2018 |
| IN | 108024256 A | 5/2018 |
| WO | 2016112676 A1 | 7/2016 |
| WO | 2016192639 A1 | 12/2016 |
| WO | 2017080517 A1 | 5/2017 |
| WO | 2017097169 A1 | 6/2017 |
| WO | 2018040042 A1 | 3/2018 |

OTHER PUBLICATIONS

3GPP TS 28.516 V1.0.0 "3rd Generation Partnership Project; Technical Specification Group Services and System Aspects; Telecommunication management; Fault Management (FM) for mobile networks that include Virtualized network functions; Procedures (Release 14)," Sep. 2016, 13 pages.

3GPP TS 28.532 V0.3.0, "3rd Generation Partnership Project; Technical Specification Group Services and System Aspects; Management and orchestration of networks and network slicing; Provisioning; Stage 2 and stage 3 (Release 15)," May 2018, 39 pages.

3GPP TS 28.541 V1.0.0, "3rd Generation Partnership Project; Technical Specification Group Services and System Aspects; Telecommunication Management; Management and orchestration of networks and network slicing; NR and NG-RAN Network Resource Model (NRM); Stage 2 and stage 3 (Release 15)," Jun. 2018, 34 pages.

3GPP TS 28.622 V15.0.0, "3rd Generation Partnership Project; Technical Specification Group Services and System Aspects; Telecommunication management; Generic Network Resource Model (NRM) Integration Reference Point (IRP); Information Service (IS) (Release 15)," Mar. 2018, 24 pages.

3GPP TS 28.545 V0.3.0, "3rd Generation Partnership Project; Technical Specification Group Services and System Aspects; Management and orchestration of networks and network slicing; Fault Supervision (FS); Stage 1 (Release 15)," May 2018, 18 pages.

Huawei, "Discussion paper on mapping of VNF application alarm and VNF instance related virtualized resource alarm," 3GPP TSG SA WG5 (Telecom Management) Meeting #106, S5-162127, Kanazawa (Japan), Apr. 11-15, 2016, 3 pages.

Huawei, "28.545 Add requirements for VNF alarm correlation," 3GPP TSG SA WG5 (Telecom Management) Meeting #118 S5-182199, Apr. 9-13, 2018, Beijing, China, 1 page.

ETSI GR NFV-IFA 015 V2.4.1, "Network Functions Virtualisation (NFV) Release 2; Management and Orchestration; Report on NFV Information Model (Release 2)," Feb. 2018, 14 pages.

Huawei, "28.545 Add requirements for VNF alarm correlation," 3GPP TSG SA WG5 (Telecom Management) Meeting #118, S5-182407, Apr. 9-13, 2018, Beijing, China, 2 pages.

3GPP TS 28.533 V0.3.0, "3rd Generation Partnership Project; Technical Specification Group and System Aspects; Management and orchestration of networks and network slicing; Management and orchestration architecture (Release 15)," May 2018, 17 pages.

* cited by examiner

| Identifier information of a network slice instance | Identifier information of a VNF instance | Identifier information of a VNFC instance |
|---|---|---|
| ID 11 | ID 21 | ID 31 |
| ID 12 | ID 22 | ID 32 |
| ID 13 | ID 21 | ID 33 |

FIG. 6

| Alarm filtering list ||
|---|---|
| ID 21 | ID 33 |

FIG. 7

| First correspondence |||
|---|---|---|
| Identifier information of a first network slice instance | Alarm filtering list ||
| ID 13 | ID 21 | ID 33 |

FIG. 8

ALARM METHOD AND APPARATUS

CROSS-REFERENCE TO RELATED APPLICATIONS

This application is a continuation of International Patent Application No. PCT/CN2019/090525, filed on Jun. 10, 2019, which claims priority to Chinese Patent Application No. 201810621708.7, filed on Jun. 15, 2018, The disclosures of the aforementioned applications are hereby incorporated by reference in their entireties.

TECHNICAL FIELD

This application relates to the field of communications technologies, and in particular, to an alarm method and apparatus.

BACKGROUND

A network slice (network slice, NS) technology is introduced to a 5th generation mobile communications (the 5th-generation, 5G) system. A network slice is a logical network customized on a physical or virtual network infrastructure according to different service requirements. After being instantiated as a specific network slice instance (network slice instance, NSI), a network slice becomes a really running logical network, and meets a particular network feature or service requirement. An NSI may be created by using a network function virtualization (network function virtualization, NFV) technology. Usually, one network slice needs to implement one or more network functions. Correspondingly, the NSI created by using the NFV technology may include one or more network function instances (network function instance, NH). It may be understood that one NFI can implement one network function. To be specific, in an NFV architecture, an NFI is deployed to implement a corresponding network function. Specifically, a plurality of virtual network function (virtual network function, VNF) instances are deployed by using resources in an NFV infrastructure (NFV infrastructure, NFVI), to deploy an NFI. The NFI includes a plurality of VNF instances and connections between the VNF instances. Because one NSI may include one or more NFIs, it may be understood that one NSI may include a plurality of VNF instances and connections between the VNF instances. Therefore, the NSI is deployed by deploying the NFI. One VNF instance usually includes a plurality of VNF component (VNF component, VNFC) instances.

Before the network slice technology is introduced, each NFI belongs to an entire network. Therefore, a VNF instance included in each NFI also belongs to the entire network. When a resource (for example, a virtual machine for deploying an NFI) for deploying an NFI in the NFVI is faulty, the following types of alarms may be generated. One type is an alarm generated by the fault of the resource for deploying the NFI in the NFVI, and to distinguish from another alarm, this type of alarm is referred to as a virtualized resource alarm below. Another type is an alarm that is caused by the fault of the resource for deploying the NFI in the NFVI and that is generated by a fault of a VNF instance deployed on the faulty resource, and this type of alarm is referred to as a VNF alarm below. A management and orchestration (management and orchestration, MANO) network element in the NFV architecture may associate a virtualized resource alarm with a corresponding VNF alarm, and an element management system (element management system, EMS) entity may associate the virtualized resource alarm with a corresponding NFI based on an identifier that is of a network function instance and that is carried in the VNF alarm.

After the network slice technology is introduced, a plurality of network slices may need to implement a same network function. Therefore, a same NFI may be shared by a plurality of NSIs. When a resource for deploying an NFI in the NFVI is faulty, if the NFI is exclusive for a network slice, a fault of only one network slice instance is caused. However, if the NFI is shared by a plurality of network slices, faults of a plurality of network slice instances deployed on the faulty resource are caused. In the prior art, only a method for associating a virtualized resource alarm with a corresponding NFI is provided, but there is no method for associating the virtualized resource alarm with a corresponding network slice instance. Therefore, a reason for a fault of a network slice instance cannot be analyzed in the prior art.

SUMMARY

Embodiments of this application provide an alarm method and apparatus, to resolve a problem that a reason for a fault of a network slice instance cannot be analyzed in the prior art.

To achieve the foregoing objective, the embodiments of this application provide the following technical solutions:

According to a first aspect, an alarm method is provided. The method may be performed by a first service entity or a chip in a first service entity. The first service entity may be a network slice management function (network slice management function, NSMF) entity or a network slice subnet management function (network slice subnet management function, NSSMF) entity, and the first service entity is configured to manage a network slice instance. The method includes: first, sending, by the first service entity, a first request to a second service entity, where the second service entity is configured to manage an alarm of a network function instance; the first request includes identifier information of a VNF instance; the first request is used to request a virtualized resource alarm carrying the identifier information; and there is a correspondence between the VNF instance and a first network slice instance managed by the first service entity; second, after receiving the first request, determining, by the second service entity in at least one virtualized resource alarm received from a MANO network element, the virtualized resource alarm carrying the identifier information of the VNF instance; and then, adding, by the second service entity, the virtualized resource alarm to a first response, and sending the first response to the first service entity.

According to the foregoing method, the first service entity sends, to the second service entity, the first request carrying the identifier information of the VNF instance, to request the second service entity to send, to the first service entity, the virtualized resource alarm carrying the identifier information of the VNF instance; and the second service entity determines, in the at least one virtualized resource alarm received from the MANO network element, the virtualized resource alarm carrying the identifier information of the VNF instance, and sends the virtualized resource alarm to the first service entity. Because there is the correspondence between the VNF instance and the first network slice instance, the first service entity may associate the virtualized resource alarm with the first network slice instance based on the correspondence. Therefore, when a fault of a network slice instance is caused, a reason for the fault of the network slice instance can be analyzed based on a virtualized resource alarm associated with the network slice instance.

In this embodiment of this application, the first request may include identifier information of one VNF instance or identifier information of a plurality of VNF instances. This is not limited in this application.

In a possible design, the identifier information of the VNF instance may be carried in an alarm filtering list included in the first request, and there is a correspondence between the alarm filtering list and a first network slice instance. The first request further includes a first correspondence, and the first correspondence is the correspondence between the alarm filtering list and the first network slice instance. After receiving the first request from the first service entity, the second service entity may further store the alarm filtering list and the first correspondence. In this way, the second service entity may associate the virtualized resource alarm received from the MANO network element with a corresponding network slice instance by using the alarm filtering list and the first correspondence that are stored. Therefore, when a fault of the network slice instance is caused, a reason for the fault of the network slice instance can be analyzed based on the virtualized resource alarm associated with the network slice instance.

In this embodiment of this application, after receiving the first response from the second service entity, the first service entity may further associate the virtualized resource alarm carried in the first response with the first network slice instance. It should be noted that, the first service entity may associate the virtualized resource alarm with the first network slice instance; or certainly, the second service entity may associate the virtualized resource alarm with the first network slice instance.

In a possible design, after receiving the virtualized resource alarm from the second service entity, the first service entity associates, based on the identifier information that is of the VNF instance and that is carried in the virtualized resource alarm, the virtualized resource alarm with the prestored alarm filtering list including the identifier information of the VNF instance, and associates, based on the prestored first correspondence, the virtualized resource alarm with the first network slice instance having the correspondence with the alarm filtering list, where the first correspondence is the correspondence between the alarm filtering list and the first network slice instance.

In another possible design, if the second service entity already stores the alarm filtering list and the first correspondence, the second service entity may associate, based on the identifier information that is of the VNF instance and that is carried in the alarm filtering list, the virtualized resource alarm carrying the identifier information of the VNF instance with the alarm filtering list including the identifier information of the VNF instance, and associate, based on the first correspondence, the virtualized resource alarm with the first network slice instance having the correspondence with the alarm filtering list.

In a possible design, after associating the virtualized resource alarm with the first network slice instance, the second service entity may send the virtualized resource alarm associated with the first network slice instance to the first service entity (namely, an entity managing the first network slice instance). The second service entity may actively or passively send the virtualized resource alarm. In an implementation, the second service entity passively sends the virtualized resource alarm associated with the first network slice instance to the first service entity. The second service entity receives the second request from the first service entity, where the second request carries identifier information of the first network slice instance, and the second request is used to request the virtualized resource alarm associated with the first network slice instance; and the second service entity sends a second response to the first service entity, where the second response carries the virtualized resource alarm associated with the first network slice instance.

In a possible design, if the second service entity does not associate the virtualized resource alarm with the first network slice instance, the first service entity may request, from the second service entity, the virtualized resource alarm carrying the identifier information that is of the VNF instance and that is included in the alarm filtering list. In an implementation, the first service entity sends a second request to the second service entity, where the second request carries identifier information of the first network slice instance, and the second request is used to request the virtualized resource alarm carrying the identifier information that is of the VNF instance and that is included in the alarm filtering list; and the first service entity receives a second response from the second service entity, where the second response carries the virtualized resource alarm.

In a possible design, the first request may further carry identifier information of a VNFC instance, and the VNFC instance is a VNFC instance that is included in the VNF instance and that belongs to the first network slice instance. In this way, a virtualized resource alarm carrying the identifier information of the VNF instance and the identifier information of the VNFC instance can be more accurately associated with the network slice instance. When the first request carries the identifier information of the VNFC instance, the first request is used to request the virtualized resource alarm carrying the identifier information of the VNF instance and the identifier information of the VNFC instance.

In this embodiment of this application, how the first service entity generates the alarm filtering list and the first correspondence is not limited.

In a possible design, the first service entity sends a third request to a third service entity, where the third request carries the identifier information of the first network slice instance, and the third request is used to request the identifier information of the VNF instance having the correspondence with the first network slice instance; after receiving the third request, the third service entity searches, based on the identifier information of the first network slice instance and prestored correspondences between identifier information of a plurality of network slice instances and identifier information of VNF instances, for the identifier information of the VNF instance having the correspondence with the first network slice instance, and adds the identifier information of the VNF instance having the correspondence with the first network slice instance to a third response and sends the third response to the first service entity; and the first service entity then generates the alarm filtering list based on the identifier information of the VNF instance, and generates the first correspondence based on the alarm filtering list and the identifier information of the first network slice instance.

In a possible design, in addition to the identifier information of the VNF instance, the alarm filtering list further carries the identifier information of the VNFC instance that is included in the VNF instance and that belongs to the first network slice instance. In this design, the third request sent by the first service entity to the third service entity is further used to request the identifier information of the VNFC instance that is included in the VNF instance and that belongs to the first network slice instance. Correspondingly, after receiving the third request, the third service entity searches for the identifier information of the VNF instance based on the identifier information of the first network slice instance and prestored correspondences between identifier information of a plurality of network slice instances and identifier information of VNF instances, and the third service entity searches for the identifier information of the VNFC instance based on the identifier information of the first network slice instance and prestored correspondences between identifier information of a plurality of network slice instances and identifier information of VNFC instances, and adds the identifier information of the VNF instance and the identifier information of the VNFC instance to the third response and sends the third response to the first service entity, where the VNF instance and the VNFC instance have the correspondences with the first network slice instance. After receiving the identifier information of the VNF instance and the identifier information of the VNFC instance that are sent by the third service entity, the first service entity generates the alarm filtering list based on the identifier information of the VNF instance and the identifier information of the VNFC instance, and generates the first correspondence based on the alarm filtering list and the identifier information of the first network slice instance.

According to a second aspect, an alarm method is provided. The method may be performed by a second service entity or a chip in a second service entity. The second service entity may be a network function management function (network function management function, NFMF) entity or an EMS entity, and the second service entity is configured to manage an alarm of a network function instance. The method includes: receiving, by the second service entity, a first request from a first service entity, where the first service entity is configured to manage a network slice instance, where the first request includes identifier information of a first network slice instance managed by the first service entity, and the first request is used to request a virtualized resource alarm associated with the first network slice instance; sending, by the second service entity, a second request to a third service entity, where the third service entity is configured to manage a network function instance; the second request carries identifier information of the first network slice instance; the second request is used to request identifier information of a VNF instance belonging to the first network slice instance; and the VNF instance is used to deploy a network function instance belonging to the first network slice instance; receiving, by the second service entity, a second response from the third service entity, where the second response carries the identifier information of the VNF instance; determining, by the second service entity in at least one virtualized resource alarm received from a MANO network element, the virtualized resource alarm carrying the identifier information of the VNF instance, and associating the virtualized resource alarm carrying the identifier information of the VNF instance with the first network slice instance; and sending, by the second service entity, a first response to the first service entity, where the first response includes the virtualized resource alarm associated with the first network slice instance.

According to the foregoing method, the second service entity may determine, based on the identifier information that is of the first network slice instance and that is included in the received first request and the identifier information of the VNF instance belonging to the first network slice instance, in the at least one virtualized resource alarm received from the MANO network element, the virtualized resource alarm carrying the identifier information of the VNF instance, and associate the virtualized resource alarm carrying the identifier information of the VNF instance with the first network slice instance. Therefore, when a fault of the first network slice instance is caused, a reason for the fault of the first network slice instance can be analyzed based on the virtualized resource alarm associated with the first network slice instance.

It should be noted that, before receiving the first request from the first service entity, the second service entity may alternatively send the second request to the third service entity. This is not limited in this application.

In a possible design, the second request is further used to request identifier information of a VNFC instance; the VNFC instance is a VNFC instance that is included in the VNF instance and that belongs to the first network slice instance; and the second response further carries the identifier information of the VNFC instance; and the second service entity determines, in the at least one virtualized resource alarm received from the MANO network element, a virtualized resource alarm carrying the identifier information of the VNF instance and the identifier information of the VNFC instance, and associates the virtualized resource alarm carrying the identifier information of the VNF instance and the identifier information of the VNFC instance with the first network slice instance. Therefore, when the fault of the first network slice instance is caused, the reason for the fault of the first network slice instance can be analyzed based on the virtualized resource alarm associated with the first network slice instance.

In a possible design, the second request may further carry identifier information of a first network function instance; the first network function instance is one of network function instances included in the first network slice instance; the VNF instance is used to deploy the first network function instance; and the VNFC instance is a VNFC instance that is included in the VNF instance and that belongs to the first network function instance. According to the method, the second service entity may request, from the third service entity, VNF instances for deploying some network function instances included in the network slice instance.

In a possible design, after receiving the second response from the third service entity, the second service entity may generate and store an alarm filtering list based on the identifier information of the VNF instance and the identifier information of the VNFC instance that are carried in the second response, where the alarm filtering list includes the identifier information of the VNF instance and the identifier information of the VNFC instance; and generate and store a first correspondence based on the alarm filtering list and the identifier information of the first network slice instance, where the first correspondence is a correspondence between the alarm filtering list and the first network slice instance; and the second service entity may further determine, in the at least one virtualized resource alarm received from the MANO network element, the virtualized resource alarm carrying the identifier information of the VNF instance and the identifier information of the VNFC instance that are included in the alarm filtering list, and associate, based on the first correspondence, the virtualized resource alarm carrying the identifier information of the VNF instance and the identifier information of the VNFC instance with the first network slice instance.

According to a third aspect, an alarm apparatus is provided. The apparatus has a function of implementing the first service entity in the foregoing method embodiment. The function may be implemented by hardware, or may be implemented by hardware by executing corresponding software. The hardware or the software includes one or more modules corresponding to the function.

In a possible design, the apparatus includes a processor, a transceiver, and a memory. The memory is configured to store a computer executable instruction. The transceiver is configured to implement communication between the apparatus and another communications entity. The processor is connected to the memory by using a bus. When the apparatus is run, the processor executes the computer executable instruction stored in the memory, so that the apparatus performs the method according to the first aspect or the second aspect.

In a possible design, the apparatus includes a processing unit, a transceiver unit, and a storage unit. The storage unit is configured to store a computer executable instruction. The transceiver unit is configured to implement communication between the apparatus and another communications entity. The processing unit is connected to the storage unit by using a bus. When the apparatus is run, the processing unit executes the computer executable instruction stored in the storage unit, so that the apparatus performs the method according to the first aspect or the second aspect.

According to a fourth aspect, an alarm apparatus is provided. The apparatus has a function of implementing the second service entity in the foregoing method embodiment. The function may be implemented by hardware, or may be implemented by hardware by executing corresponding software. The hardware or the software includes one or more modules corresponding to the function.

In a possible design, the apparatus includes a processor, a transceiver, and a memory. The memory is configured to store a computer executable instruction. The transceiver is configured to implement communication between the apparatus and another communications entity. The processor is connected to the memory by using a bus. When the apparatus is run, the processor executes the computer executable instruction stored in the memory, so that the apparatus performs the method according to the first aspect or the second aspect.

In a possible design, the apparatus includes a processing unit, a transceiver unit, and a storage unit. The storage unit is configured to store a computer executable instruction. The transceiver unit is configured to implement communication between the apparatus and another communications entity. The processing unit is connected to the storage unit by using a bus. When the apparatus is run, the processing unit executes the computer executable instruction stored in the storage unit, so that the apparatus performs the method according to the first aspect or the second aspect.

According to a fifth aspect, an alarm apparatus is provided. The apparatus has a function of implementing the third service entity in the foregoing method embodiment. The function may be implemented by hardware, or may be implemented by hardware by executing corresponding software. The hardware or the software includes one or more modules corresponding to the function.

In a possible design, the apparatus includes a processor, a transceiver, and a memory. The memory is configured to store a computer executable instruction. The transceiver is configured to implement communication between the apparatus and another communications entity. The processor is connected to the memory by using a bus. When the apparatus is run, the processor executes the computer executable instruction stored in the memory, so that the apparatus performs the method according to the first aspect or the second aspect.

In a possible design, the apparatus includes a processing unit, a transceiver unit, and a storage unit. The storage unit is configured to store a computer executable instruction. The transceiver unit is configured to implement communication between the apparatus and another communications entity. The processing unit is connected to the storage unit by using a bus. When the apparatus is run, the processing unit executes the computer executable instruction stored in the storage unit, so that the apparatus performs the method according to the first aspect or the second aspect.

According to a sixth aspect, an embodiment of this application provides a computer storage medium, configured to store a computer software instruction used by a first service entity, where the computer software instruction includes a program designed for the first service entity to perform the foregoing aspects.

According to a seventh aspect, an embodiment of this application provides a computer storage medium, configured to store a computer software instruction used by a second service entity, where the computer software instruction includes a program designed for the second service entity to perform the foregoing aspects.

According to an eighth aspect, an embodiment of this application provides a computer program product. The computer program product includes a computer software instruction, and the computer software instruction may be loaded by a processor to implement the procedure in the method according to the first aspect or the second aspect.

According to a ninth aspect, an embodiment of this application provides a chip, including a processor and a transceiver component, optionally, further including a memory, and configured to perform the method according to the first aspect or the second aspect.

BRIEF DESCRIPTION OF DRAWINGS

FIG. 6 is a schematic diagram of a correspondence between identifier information of a network slice instance and identifier information of a VNF instance according to an embodiment of this application;

FIG. 7 is a schematic diagram of an alarm filtering list according to an embodiment of this application;

FIG. 8 is a schematic diagram of a first correspondence according to an embodiment of this application;

DESCRIPTION OF EMBODIMENTS

The following describes this application in detail with reference to the accompanying drawings in this specification.

With continuous emergence of various communication services, requirements of different communication services for network performance are significantly different. A network slice technology is introduced to a 5G system, to cope with a difference between requirements of different communication services for network performance. A network slice may be an end-to-end logical network that includes a terminal device, an access network, a transport network, a core network, and an application server, and can provide a complete communication service. The network slice may alternatively be a logical network that is randomly combined by a terminal device, an access network, a transport network, a core network, and an application server.

The network slice may be created by using a plurality of technologies, for example, may be created by using an NFV technology and a software defined networking (software defined network, SDN) technology. The embodiments of this application are described based on creation of the network slice by using only the NFV technology.

Figure 1:
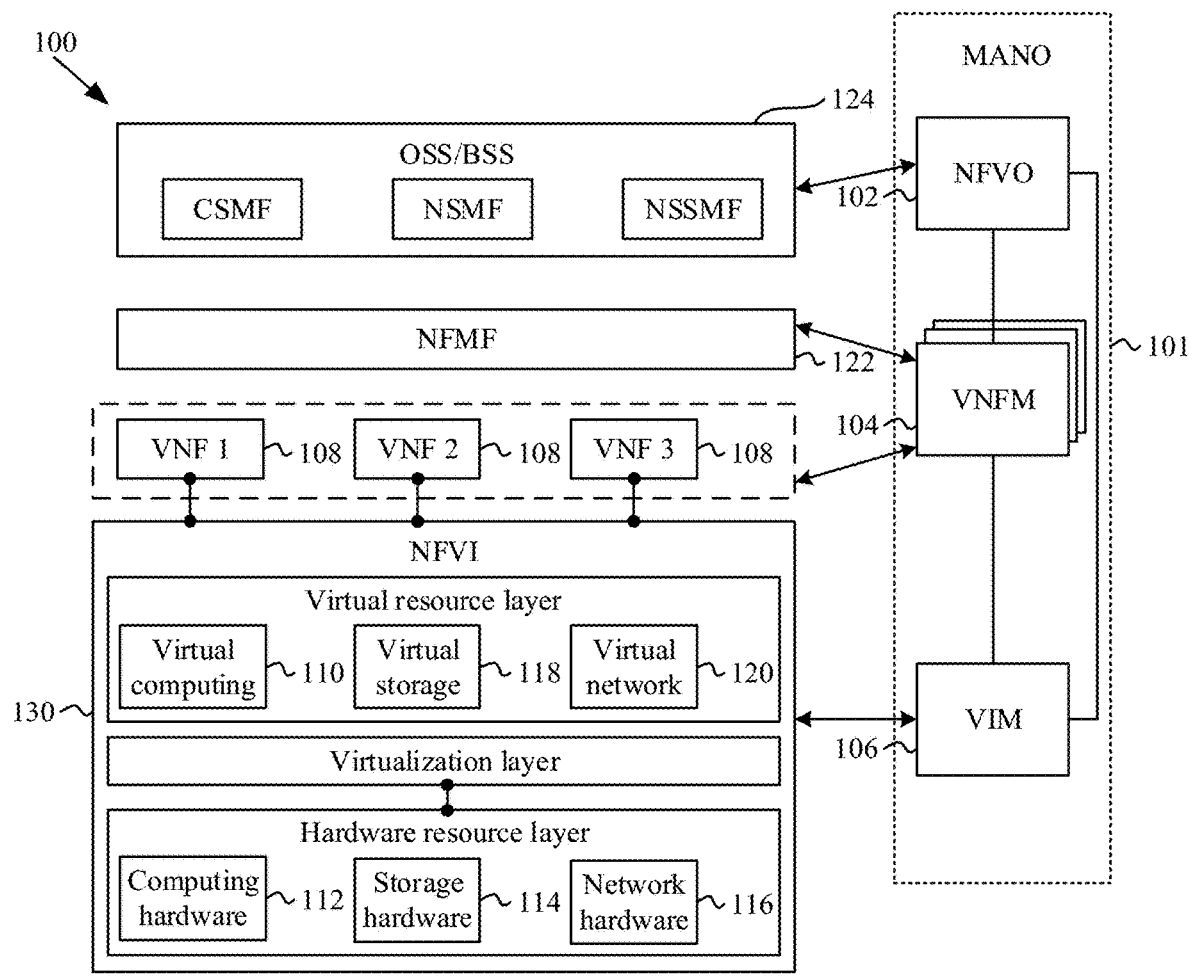
FIG. 1 is an overall schematic architectural diagram of an NFV system to which an embodiment of this application is applicable.

FIG. 1 is an overall schematic architectural diagram of an NFV system 100 to which an embodiment of this application is applicable. As shown in FIG. 1, the NFV system 100 includes a management and orchestration (management and orchestration, MANO) network element 101, an NFV infrastructure (NFV infrastructure, NFVI) layer 130, a plurality of virtual network functions (virtual network function, VNF) 108 (a VNF 1, a VNF 2, and a VNF 3), a network function management function (network function management function, NFMF) network element 122, and a business support management system (operation-support system/business support system, OSS/BSS) 124. The MANO network element 101 includes an NFV orchestrator (NFV orchestrator, NFVO) 102, one or more VNF managers (VNF manager, VNFM) 104, and a virtualized infrastructure manager (virtualized infrastructure manager, VIM) 106.

Further, the OSS/BSS 124 may include a communication service management function (communication service management function, CSMF) network element, a network slice management function (network slice management function, NSMF) network element, and a network slice subnet management function (network slice subnet management function, NSSMF) network element. An end-to-end network slice may include parts such as a radio access network, a transport network, and a core network, and each part is referred to as a network slice subnet. The NSSMF function is responsible for managing a network slice subnet. The NSMF is responsible for managing an end-to-end network slice. Functions of the NSSMF and the NSMF are similar, and a difference lies in that the NSSMF accepts a service requirement of a subnet (for example, a core network, a transport network, and an access network), and creates a network slice subnet instance (network slice subnet instance, NSSI). If all subnets are provided by one vendor, the NSSMF may not be required, and the NSMF directly creates network slice subnet instances (for example, an access network slice instance, a transport network slice instance, and a core network slice instance). Therefore, a method in the embodiments of this application is applicable to both the NSMF and the NSSMF. In other words, in this embodiment of this application, all descriptions related to the NSMF are also applicable to the NSSMF. This is not specifically limited. The NFVI 130 includes a hardware resource layer, a virtualization layer (virtualization layer), and a virtual resource layer. The hardware resource layer includes computing hardware 112, storage hardware 114, and network hardware 116. The virtual resource layer includes virtual computing (virtual computing) 110, a virtual storage 118, and a virtual network 120.

Herein, it should be noted that, FIG. 1 is merely a possible architecture example. In another possible embodiment, the NSMF network element may directly manage a network function, to be specific, has a related function of the NFMF network element. In this case, the NFMF network element 122 may not be independently disposed. In addition, in another possible embodiment, the NFMF network element 122 may be replaced with an element management system (element management system, EMS) entity, and the EMS entity is an entity that is in a conventional telecommunications system and that is configured to configure and manage a device. In an NFV architecture, the EMS entity may also be configured to configure and manage the VNF 108, and may be further configured to initiate a life cycle management operation such as instantiation of a new VNF to the VNFM 104. The foregoing network elements in this embodiment of this application may be physical entity network elements, or may be virtual network elements. This is not limited herein.

It should be noted that, in this embodiment of this application, the network element may also be referred to as a function or a function entity. For example, the NSMF network element may also be referred to as an NSMF function or an NSMF function entity, and the NFMF network element may also be referred to as an NFMF function or an NFMF function entity. Names of the network elements are not limited in this application, and a person skilled in the art may replace the names of the network elements with other names to perform same functions, which all fall within the protection scope of this application.

Functions of the network elements included in the NFV system 100 are described below.

The MANO 101 is responsible for allocating, according to an NFV deployment requirement of the network slice management function, an infrastructure resource required by a network slice, completing deployment of a virtual network function on a virtualized infrastructure, and completing a network connection between network function entities.

The NFVO 102 is mainly responsible for life cycle management of a virtualized service, allocation and scheduling of a virtualized infrastructure and a virtual resource in the NFVI, and the like. The NFVO 102 may communicate with the one or more VNFMs 104, to execute a resource-related request, send configuration information to the VNFM 104, and collect status information of the VNF 108. In addition, the NFVO 102 may also communicate with the VIM 106, to perform resource allocation and/or reservation, and exchange virtualized hardware resource configuration and status information.

The VNFM 104 is mainly responsible for life cycle management of one or more VNFs, for example, instantiating (instantiating), updating (updating), querying, scaling (scaling), or terminating (terminating) the VNF 108. The VNFM 104 may further communicate with the VNF 108 to complete life cycle management of the VNF and exchange of configuration and status information. A plurality of VNFMs may exist in the NFV architecture, and are responsible for life cycle management of different types of VNFs.

The VIM 106 is mainly responsible for controlling and managing interaction between the VNF 108 and the computing hardware 112, the storage hardware 114, the network hardware 116, the virtual computing 110, the virtual storage 118, and the virtual network 120. For example, the VIM 106 performs a resource management function, including management of an infrastructure resource, allocation (for example, adding a resource to a virtual container), and running of a function (for example, collecting NFVI fault information). The VNFM 104 and the VIM 106 may communicate with each other, to request resource allocation and exchange virtualized hardware resource configuration and status information.

The NFVI 130 is an NFV infrastructure layer, and may include a hardware component, a software component, or a combination thereof, to establish a virtualized environment, and deploy, manage, and implement the VNF 108. A hardware resource and the virtualization layer are used to provide virtualized resources, such as a virtual machine and a virtual container in another form, for the VNF 108. The hardware resource includes the computing hardware 112, the storage hardware 114, and the network hardware 116. In an implementation, resources of the computing hardware 112 and the storage hardware 114 may be centralized. The virtualization layer in the NFVI may abstract the hardware resource, and decouple the VNF 108 from an underlying physical network layer.

Each VNF 108 is run in one or more virtual containers, and corresponds to one group of network functions belonging to one or more physical devices.

The OSS/BSS 124 supports various end-to-end telecommunication services. Management functions supported by the OSS may include: network configuration, service provisioning, fault management, and the like. Management functions supported by the BSS may include: order processing, payment, product management, order management, benefit management, customer management, and the like.

The CSMF is responsible for sending a network slice order request to the NSMF according to a communication service requirement of a customer. After creating a network slice instance, the CSMF is further responsible for managing a communication service carried by the network slice instance.

The NSMF is responsible for managing an entire life cycle, such as creation, activation, running, deactivation, and deletion, of a network slice instance. The NSMF accepts a network slice order of a customer, and drives, based on a stored network slice template, a virtualization orchestration and management function entity and a slice control function entity to create a network slice instance.

Considering that network function entities in a network slice are from different vendors, the NFMF 122 may indirectly manage these network function entities by using NFMF network elements of the vendors.

The overall architecture of the NFV system is specifically described above. According to a related protocol of the 3rd generation partnership project (3rd Generation Partnership Project, 3GPP), the NSMF network element implements NFV deployment of a network slice instance by using an interface between the NSMF network element and the NFVO network element of the MANO.

Based on the schematic architectural diagram shown in FIG. 1, a procedure of a method for deploying a network slice instance is as follows: After a user subscribes to a network slice, the CSMF receives a service requirement of the user, converts the service requirement into a network slice requirement, and sends the network slice requirement to the NSMF. The NSMF converts the received network slice requirement into a network slice subnet requirement, and sends the network slice subnet requirement to the NSSMF. The NSSMF converts the network slice subnet requirement into a requirement for a network function instance that needs to be deployed, and sends the network function instance requirement to the MANO 101. The MANO 101 performs NFV deployment of the network function instance according to the received network function instance requirement. Specifically, some virtual containers (for example, virtual machines (VMware, VM)) are customized by using a resource on the NFVI 130, and then a software image of a network function to which the user subscribes is run on the virtual container, to generate a network function entity. In this case, the formed network function entity may be referred to as a VNF instance. If there are a plurality of VNF instances generated by running the software image of the network function to which the user subscribes, the plurality of VNF instances are connected to generate a complete network function instance. One VNF instance usually includes a plurality of VNF component (VNF component, VNFC) instances. When deploying a VNF instance on the NFVI 130, the MANO 101 deploys VNFC instances on a customized virtual container, and then connects the VNFC instances by using a link of a virtual network, to form the VNF instance. Because one network slice instance may include a plurality of network function instances, when all the network function instances included in the network slice instance are completely deployed, to be specific, corresponding VNF instances in the network slice instance are completely deployed, it may be understood that the network slice instance is completely deployed. Then, the NSMF directly sends or indirectly sends, by using the EMS entity, a service configuration script to the NFMF 122. The NFMF 122 executes, based on the script, a related service configuration command on the VNF instance for deploying the network slice instance, so that a service required by a user order can be normally run on a network slice. After being instantiated as a specific network slice instance (network slice instance, NSI), the network slice becomes a really running logical network, and can meet a particular network feature or service requirement.

Figure 2:
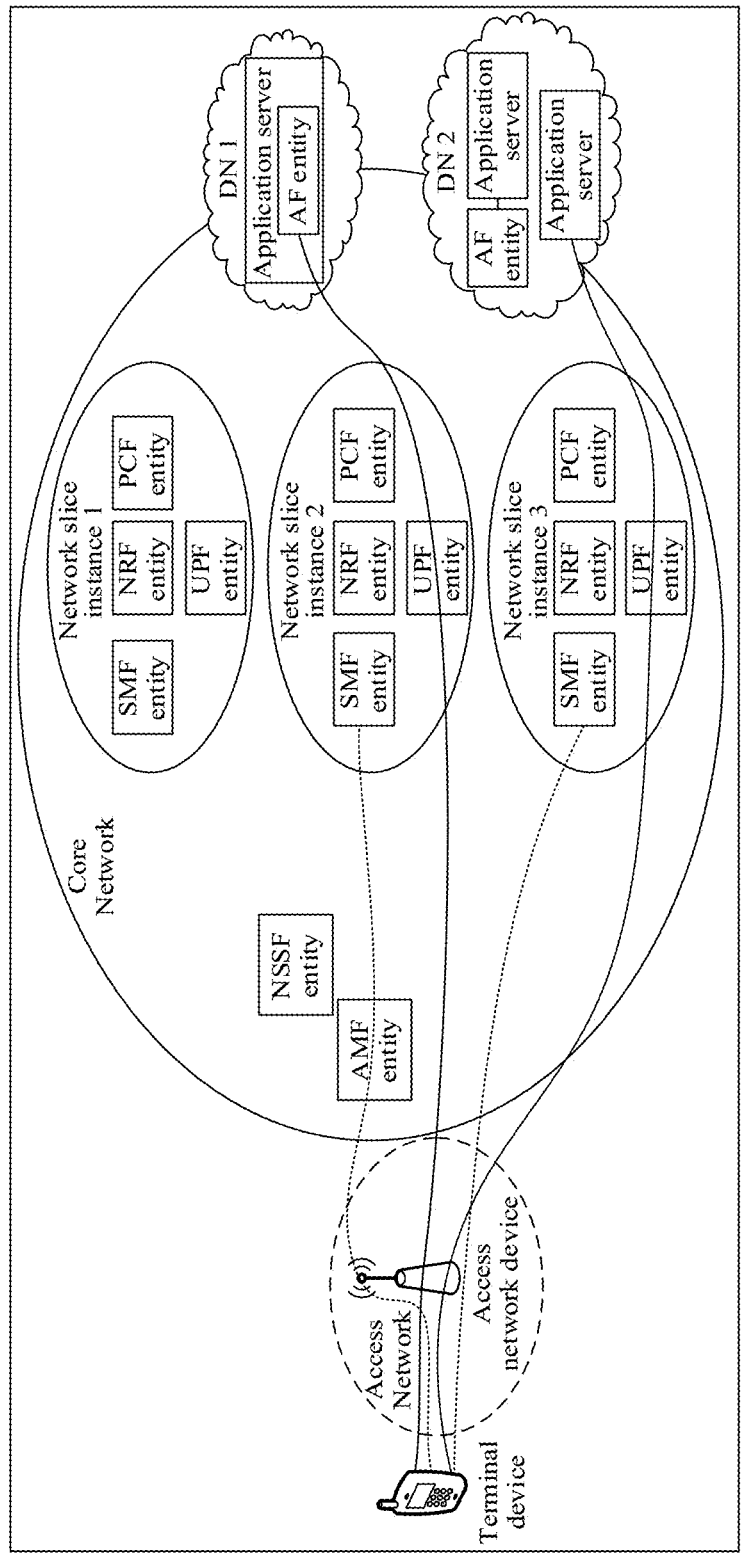
FIG. 2 is a schematic diagram of a network architecture including network slice instances.

FIG. 2 is a schematic diagram of a network architecture including network slice instances. As shown in FIG. 2, the network architecture may include a terminal device, an access network, a core network, and a data network (data network, DN). The access network may include an access network device (for example, a base station). The core network includes a plurality of network slice subnet instances (a network slice instance 1, a network slice instance 2, and a network slice instance 3) of the core network, a network slice selection function (network slice selection function, NSSF) entity, and an access and mobility management function (access and mobility management function, AMF) entity. Each network slice subnet instance of the core network may include network function entities such as a session management function (session management, SMF) entity, a network repository function (network repository function, NRF) entity, a policy control function (policy control function, PCF) entity, and a user plane function (user plane function, UPF) entity, and the network function entity in each network slice instance may be deployed by using one or more VNF instances. The DN may include an application server, and may provide an application service for the terminal device, for example, may provide an application service for the terminal device by using an application client (APP Client) on the terminal device. The application server may include an application layer service processing service module and an application function (application function, AF) entity. The AF entity may be deployed on the application server, or may be independently deployed in the DN for sharing by one or more application servers.

Before a network slice technology is introduced, an EMS entity may associate a virtualized resource alarm with a corresponding network function instance.

Figure 3:
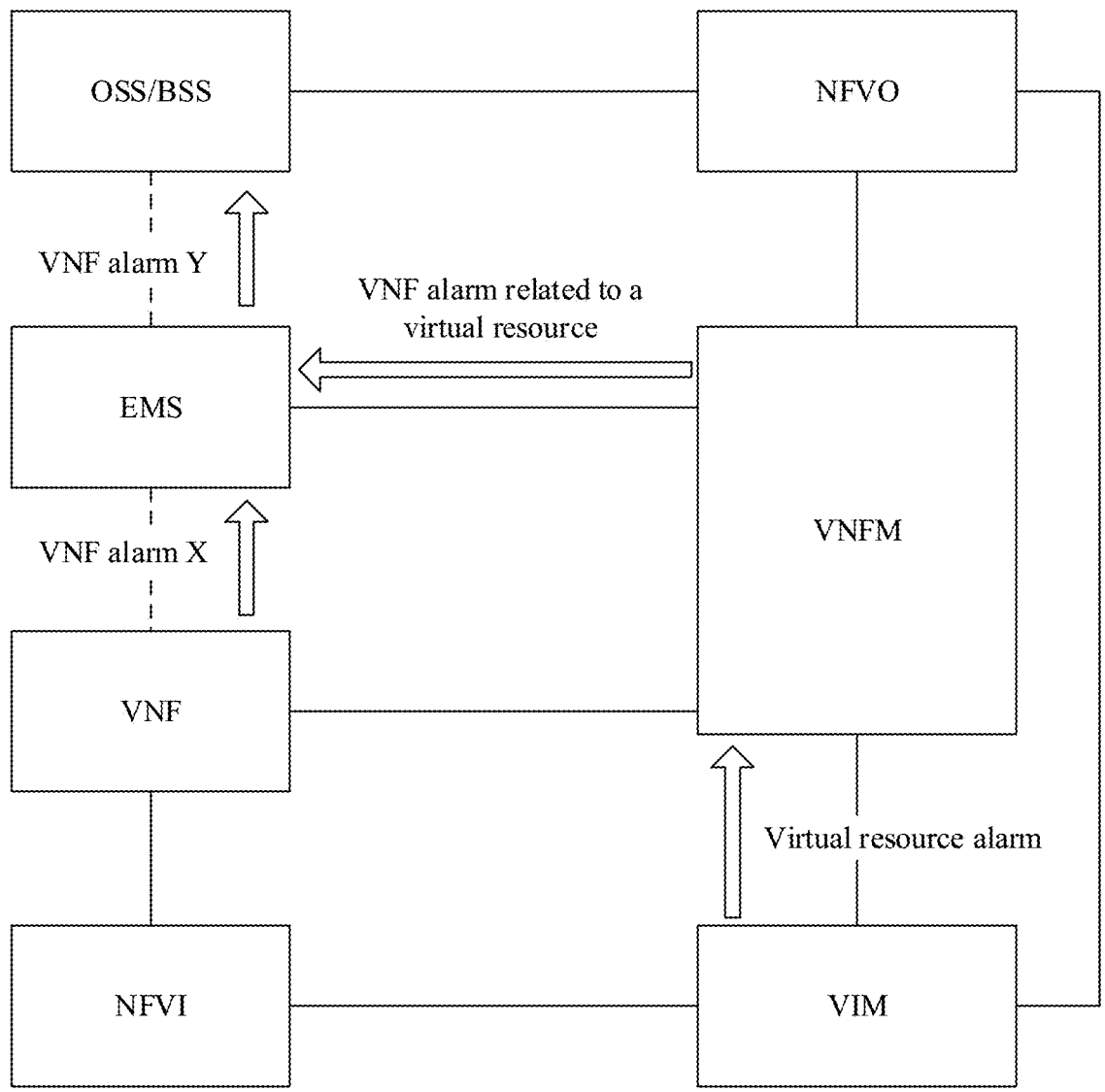
FIG. 3 is a flowchart of a method for associating a virtualized resource alarm with a network function instance.

FIG. 3 is a flowchart of a method for associating a virtualized resource alarm with a network function instance in the prior art. In FIG. 3, when a VNF instance is faulty, a fault of a network function instance deployed on the VNF instance is caused, and a VNF alarm X is generated. A VNF reports, to an EMS entity, the VNF alarm X carrying an identifier of the network function instance and an identifier of the VNF instance. Correspondingly, when the VNF instance is faulty, a fault of a virtual resource for deploying the VNF instance in an NFVI is caused. For example, when a network function service run on the VNF is overloaded, CPU usage of a VM for deploying the VNF in the NFVI exceeds a specified threshold. Consequently, the NFVI is abnormal. After obtaining abnormality information of the NFVI, a VIM generates a virtualized resource alarm (virtualized resource alarm) based on the abnormality information of the NFVI, and the VIM reports the generated virtualized resource alarm to a VNFM. The VNFM determines a VNF instance to which the VM triggering the virtualized resource alarm belongs, and adds an identifier of the VNF instance to the virtualized resource alarm, to generate a VNF alarm related to a virtual resource, and report the VNF alarm to the EMS. The EMS associates, based on the identifier that is of the VNF instance and that is carried in the VNF alarm X and an identifier that is of the VNF instance and that is carried in the VNF alarm related to the virtual resource, the VNF alarm X with the VNF alarm related to the virtual resource, where the VNF alarm X and the VNF alarm carry the identifiers of the same VNF instance, to obtain a VNF alarm Y, and associates, based on the identifier that is of the network function instance and that is carried in the VNF alarm X, the VNF alarm Y with the corresponding network function instance, to associate the virtualized resource alarm with the corresponding network function instance.

After a network slice technology is introduced, a plurality of network slices may need to implement a same network function. Therefore, a same network function instance may be shared by a plurality of network slice instances. For example, the AMF entity (which may be understood as a network function instance) in FIG. 2 may be shared by the network slice instance 2 and the network slice instance 3. Assuming that a resource for deploying the AMF entity in the NFVI is faulty (a virtualized resource alarm is generated), a fault of the network slice instance 2 and a fault of the network slice instance 3 are correspondingly caused. In the prior art, only a virtualized resource alarm can be associated with a corresponding network function instance, and cannot be accurately associated with a network slice instance. Consequently, a reason for a fault of the network slice instance cannot be analyzed.

For the foregoing problem, embodiments of this application provide an alarm method, to associate a virtualized resource alarm with a corresponding network slice instance, so that a reason for a fault of the network slice instance cannot be analyzed.

The alarm method provided in this application is described below with reference to the accompanying drawings.

Figure 4:
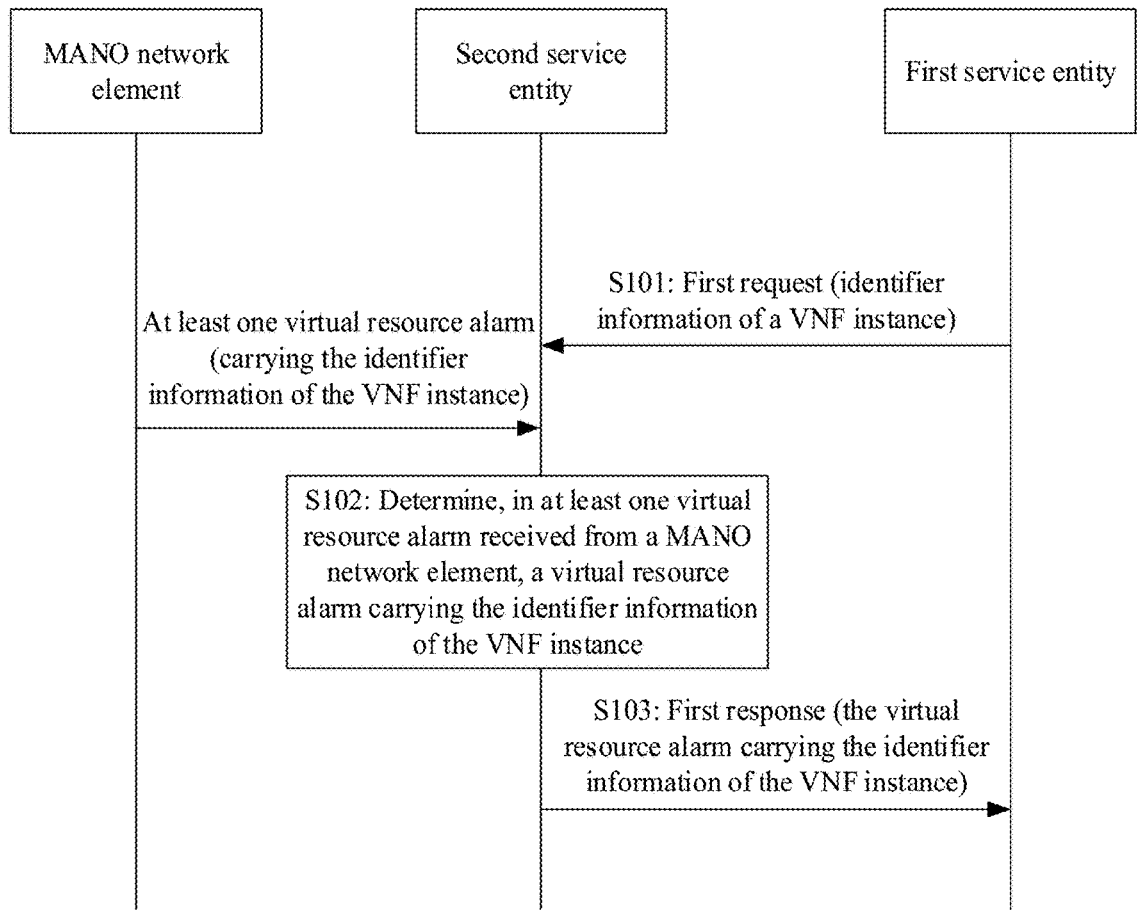
FIG. 4 is a flowchart of an alarm method according to this application.

FIG. 4 is a flowchart of an alarm method according to this application. The method includes the following steps.

S101: A first service entity sends a first request to a second service entity.

In this embodiment of this application, the first service entity is configured to manage a network slice instance, for example, may manage an alarm of the network slice instance, and specifically, may generate an alarm based on a running status of the network slice instance, and provide, for a management service consumer entity, services such as alarm display, alarm notification, alarm confirmation, and alarm clearing for a network slice. During specific application, the first service entity and the management service consumer entity may be NSMF entities or NSSMF entities. It should be noted that, when the first service entity and the management service consumer entity are a same entity, the first service entity no longer provides the foregoing service for the management service consumer entity. The second service entity is configured to manage an alarm of a network function instance, and specifically, may generate an alarm based on a running status of the network function instance, and provide, for the management service consumer entity, services such as alarm display, alarm notification, alarm confirmation, and alarm clearing for the network function instance. During specific application, the second service entity may be an NFMF entity or an EMS entity.

The network slice instance in this embodiment of this application may include an end-to-end network slice instance and/or a network slice subnet instance, and the network slice subnet instance may include a core network slice instance, an access network slice instance, a transport network slice instance, and the like. The end-to-end network slice may provide an end-to-end network service from an access network to a core network for a terminal device, and may include a core network network slice, an access network network slice, and a transport network network slice. For ease of description, a network slice included in the end-to-end network slice is referred to as a network slice subnet for short below. Without a specific limitation, the network slice in this specification may be an end-to-end network slice or a network slice subnet.

In this embodiment of this application, the first request includes identifier information of a VNF instance; the first request is used to request a virtualized resource alarm carrying the identifier information of the VNF instance; and there is a correspondence between the VNF instance and a first network slice instance managed by the first service entity.

In this embodiment of this application, that there is the correspondence between the VNF instance and the first network slice instance means that, the VNF instance is a VNF instance for deploying a network function instance included in the first network slice instance, or may be understood as that the VNF instance is a VNF instance included in the first network slice instance. In this application, that there is the correspondence between the VNF instance and the first network slice instance has a same meaning as that the first network slice instance includes the VNF instance. Differentiation is not performed in the following descriptions.

In this embodiment of this application, the virtualized resource alarm may include an alarm generated by a fault of a resource for deploying a network function instance in an NFVI, for example, may be an alarm generated by a fault of a virtual machine and/or a virtualization deployment unit (virtualization deployment unit, VDU) for deploying a network function instance. The resource for deploying the network function instance in the NFVI may include a virtual CPU, a virtual memory, and a virtual storage, and may further include bandwidth of a virtual network used to connect VNF instances, and the like.

It should be noted that, unless otherwise specified, the virtualized resource alarm in this application is a virtualized resource alarm related to the VNF instance or related to a VNFC instance included in the VNF instance. The virtualized resource alarm related to the VNF instance is the virtualized resource alarm carrying the identifier information of the VNF instance, and the virtualized resource alarm related to the VNFC instance included in the VNF instance is a virtualized resource alarm carrying the identifier information of the VNF instance and identifier information of the VNFC instance. The virtualized resource alarm related to the VNF instance or related to the VNFC instance included in the VNF instance is the same as the VNF alarm related to the virtual resource in FIG. 3. A name of this type of alarm is not limited in this application, and in the following descriptions of this application, this type of alarm is collectively referred to as a virtualized resource alarm for short.

In this embodiment of this application, the VNF instance may be an independent instance that does not include a VNFC instance, or certainly may be a VNF instance including a VNFC instance. This is not limited in this application. Although a VNF instance including a plurality of VNFC instances is shared by a plurality of network slice instances as a whole, in some scenarios, to isolate services of different network slice instances, different VNFC instances included in the VNF instance are usually used to deploy network function instances that belong to different network slice instances. It may be understood that, in this scenario, different VNFC instances included in one VNF instance belong to different network slice instances. For this scenario, the first request may further carry identifier information of a VNFC instance, and the VNFC instance is a VNFC instance that is included in the VNF instance and that belongs to the first network slice instance. In this way, a virtualized resource alarm carrying the identifier information of the VNF instance and the identifier information of the VNFC instance can be more accurately associated with the network slice instance. When the first request carries the identifier information of the VNFC instance, the first request is used to request the virtualized resource alarm carrying the identifier information of the VNF instance and the identifier information of the VNFC instance.

Optionally, the first request may further include identifier information of a virtual machine for deploying the VNF instance or the VNFC instance and/or identifier information of a VDU for deploying the VNF instance or the VNFC instance.

S102: The second service entity determines, in at least one virtualized resource alarm received from a MANO network element, the virtualized resource alarm carrying the identifier information of the VNF instance.

In this embodiment of this application, the MANO network element may be responsible for generating and collecting the virtualized resource alarm related to the network slice instance in a running process of the network slice instance, and may further send the generated virtualized resource alarm to the second service entity periodically or in real time. It should be noted that, the virtualized resource alarm sent by the MANO network element may carry the identifier information of the VNF instance, or certainly, may carry the identifier information of the VNF instance and the identifier information of the VNFC instance. An example in which the virtualized resource alarm carries the identifier information of the VNF instance is used for description below. A related processing process of the virtualized resource alarm carrying the identifier information of the VNF instance and the identifier information of the VNFC instance is similar to a processing process of the virtualized resource alarm carrying only the identifier information of the VNF instance. After receiving the virtualized resource alarm sent by the MANO network element, the second service entity may first store the virtualized resource alarm in the second service entity, and after receiving a request message for requesting the virtualized resource alarm, send the virtualized resource alarm to an entity requesting the virtualized resource alarm.

In this embodiment of this application, how the second service entity determines, in the at least one virtualized resource alarm received from the MANO network element, the virtualized resource alarm carrying the identifier information of the VNF instance is not limited. A possible implementation is provided below.

In a possible implementation, the second service entity may compare identifier information that is of the VNF instance and that is carried in each of the at least one virtualized resource alarm sent by the MANO network element with the identifier information that is of the VNF instance and that is carried in the first request sent by the first service entity, to determine, in the at least one virtualized resource alarm received from the MANO network element, the virtualized resource alarm carrying the identifier information that is of the VNF instance and that is included in the first request. For example, it is assumed that the second service entity receives, from the MANO network element, three virtualized resource alarms that are respectively a virtualized resource alarm A, a virtualized resource alarm B, and a virtualized resource alarm C, where identifier information that is of the VNF instance and that is carried in the virtualized resource alarm A is ID1, identifier information that is of the VNF instance and that is carried in the virtualized resource alarm B is ID2, and identifier information that is of the VNF instance and that is carried in the virtualized resource alarm C is ID3. In addition, it is assumed that the identifier information that is of the VNF instance and that is included in the first request is ID2. In this case, the second service entity may compare the identifier information that is of the VNF instance and that is carried in each of the virtualized resource alarm A, the virtualized resource alarm B, and the virtualized resource alarm C with the identifier information ID2 that is of the VNF instance and that is included in the first request, to determine, in the three virtualized resource alarms, the virtualized resource alarm B carrying ID2.

S103: The first service entity receives a first response from the second service entity. The first response includes the virtualized resource alarm carrying the identifier information of the VNF instance.

In this embodiment of this application, if the second service entity determines, after receiving the first request from the first service entity, that no virtualized resource alarm requested by the first service entity exists in the second service entity, the second service entity waits for the MANO network element to send the virtualized resource alarm requested by the first service entity to the second service entity, and after receiving the virtualized resource alarm that is sent by the MANO network element to the second service entity and that is requested by the first service entity, adds the virtualized resource alarm to the first response and sends the first response to the first service entity. If the second service entity determines, when receiving the first request from the first service entity, that the second service entity already stores the virtualized resource alarm requested by the first service entity, the second service entity may immediately add the virtualized resource alarm to the first response and send the first response to the first service entity.

In this embodiment of this application, the first service entity sends, to the second service entity, the first request carrying the identifier information of the VNF instance, to request the second service entity to send, to the first service entity, the virtualized resource alarm carrying the identifier information of the VNF instance. The second service entity determines, in the at least one virtualized resource alarm received from the MANO network element, the virtualized resource alarm carrying the identifier information of the VNF instance, and sends the virtualized resource alarm to the first service entity. Because there is the correspondence between the VNF instance and the first network slice instance, the first service entity may associate the virtualized resource alarm with the first network slice instance based on the correspondence. Specifically, the first service entity may determine the corresponding VNF instance based on the identifier information that is of the VNF instance and that is carried in the virtualized resource alarm, and then correctly associate the virtualized resource alarm with the first network slice instance based on the correspondence between the VNF instance and the first network slice instance, so that when a fault of the network slice instance is caused, a reason for the fault of the network slice instance can be analyzed based on the virtualized resource alarm associated with the network slice instance.

In this embodiment of this application, the first request may include identifier information of one VNF instance or identifier information of a plurality of VNF instances. This is not limited in this application. The identifier information of the VNF instance may be carried in an alarm filtering list included in the first request, and there is a correspondence between the alarm filtering list and the first network slice instance. When the VNF instance further includes a plurality of VNFC instances, the alarm filtering list may further carry identifier information of a VNFC instance that is in the plurality of VNFC instances and that belongs to the first network slice instance. The VNFC instance belonging to the first network slice instance is a VNFC instance used to deploy a network function instance included in the first network slice instance. Differentiation is not performed in the following descriptions.

That there is the correspondence between the alarm filtering list and the first network slice instance means that, the VNF instance corresponding to the identifier information that is of the VNF instance and that is included in the alarm filtering list is a VNF instance included in the first network slice instance.

In a possible implementation, the first request may further include a first correspondence, and the first correspondence is the correspondence between the alarm filtering list and the first network slice instance.

Figure 5:
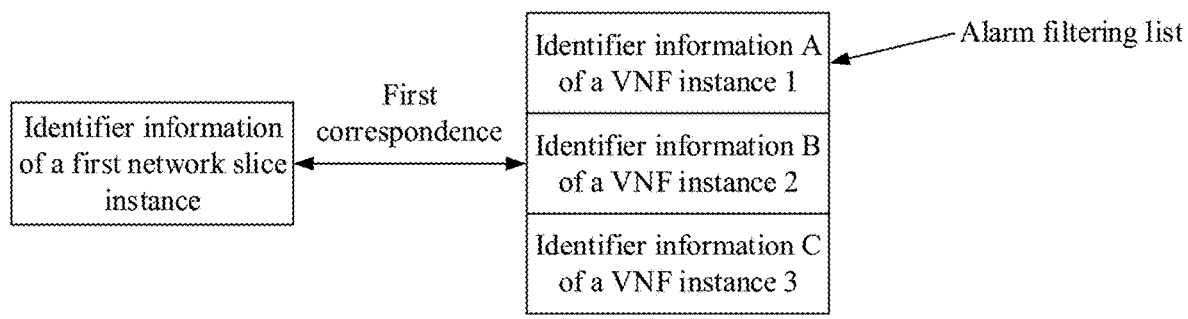
FIG. 5 is a schematic diagram of a first correspondence according to an embodiment of this application.

Optionally, the first correspondence may be in a form of a list, or certainly may be in another form. FIG. 5 is a schematic diagram of the first correspondence according to an embodiment of this application.

In this embodiment of this application, after receiving the first request from the first service entity, the second service entity may further store the alarm filtering list and the first correspondence that are included in the first request, for subsequent use.

In this embodiment of this application, after sending the alarm filtering list and the first correspondence to the second service entity, the first service entity may further request the second service entity to send a virtualized resource alarm carrying identifier information that is of all VNF instances and that is included in the alarm filtering list. Optionally, alarm information of the virtualized resource alarm may be further requested, and the alarm information includes at least one of alarm identifier information and alarm content.

In an implementation, the first service entity sends a second request to the second service entity, where the second request carries the identifier information of the first network slice instance, and the second request is used to request the virtualized resource alarm carrying the identifier information that is of the VNF instance and that is included in the alarm filtering list, so that the second service entity searches, based on the identifier information of the first network slice instance and the stored first correspondence, for the stored alarm filtering list having the correspondence with the first network slice instance, and determines, based on the alarm filtering list, the virtualized resource alarm carrying the identifier information that is of the VNF instance and that is included in the alarm filtering list, to add the virtualized resource alarm to a second response and send the second response to the first service entity.

In this embodiment of this application, how the first service entity generates the alarm filtering list and the first correspondence is not limited. In a possible implementation, the first service entity sends a third request to a third service entity, where the third request carries the identifier information of the first network slice instance, and the third request is used to request the identifier information of the VNF instance having the correspondence with the first network slice instance. After receiving the third request, the third service entity searches, based on the identifier information of the first network slice instance and prestored correspondences between identifier information of a plurality of network slice instances and identifier information of VNF instances, for the identifier information of the VNF instance having the correspondence with the first network slice instance, and adds the identifier information of the VNF instance having the correspondence with the first network slice instance to a third response and sends the third response to the first service entity. The first service entity then generates the alarm filtering list based on the identifier information of the VNF instance, and generates the first correspondence based on the alarm filtering list and the identifier information of the first network slice instance. In another possible implementation, in addition to the identifier information of the VNF instance, the alarm filtering list further carries the identifier information of the VNFC instance that is included in the VNF instance and that belongs to the first network slice instance. In this implementation, the third request sent by the first service entity to the third service entity is further used to request the identifier information of the VNFC instance that is included in the VNF instance and that belongs to the first network slice instance. Correspondingly, in addition to the identifier information of the VNF instance, the third response sent by the third service entity to the first service entity further carries the identifier information of the VNFC instance. After receiving the identifier information of the VNF instance and the identifier information of the VNFC instance that are sent by the third service entity, the first service entity generates the alarm filtering list based on the identifier information of the VNF instance and the identifier information of the VNFC instance, and generates the first correspondence based on the alarm filtering list and the identifier information of first network slice instance.

In this embodiment of this application, the third service entity may also be configured to manage a network function instance, for example, may provide, for the management service consumer entity, services such as creation, modification, deployment, and service configuration enabling of a network function instance. In a process of creating and modifying the network function instance, the third service entity may allocate, by invoking the MANO network element, a virtual resource to the network function instance included in the network function instance, and then may create a virtual machine and/or a VDU based on the allocated virtual resource, to generate the VNF instance, and enable the network function instance to be run on the VNF instance. During specific application, the third service entity may be an NFMF entity or an EMS entity.

How to generate the alarm filtering list and the first correspondence is described in detail below by using an example in which the alarm filtering list carries the identifier information of the VNF instance and the identifier information of the VNFC instance.

Referring to FIG. 6, it is assumed that FIG. 6 shows correspondences that are between identifier information of a plurality of network slice instances and identifier information of VNF instances and that are prestored in the third service entity. The correspondences are presented in a form of a list, and certainly, are not limited thereto, or may be presented in another form. In addition, it is assumed that the identifier information of the first network slice instance is ID13. Based on the correspondences in FIG. 6, after receiving the third request used to request the identifier information of the VNF instance and the identifier information of the VNFC instance, the third service entity searches, based on ID13 and the correspondences in FIG. 6, for the identifier information of the VNF instance and the identifier information of the VNFC instance, where the VNF instance and the VNFC instance have the correspondences with the first network slice instance. It can be learned from FIG. 6 that, the identifier information of the VNF instance and the identifier information of the VNFC instance are respectively ID21 and ID33, where the VNF instance and the VNFC instance have the correspondences with the first network slice instance, and after finding ID21 and ID33, the third service entity adds ID21 and ID33 to the third response and sends the third response to the first service entity. The first service entity then generates the alarm filtering list based on the identifier information of the VNF instance and the identifier information of the VNFC instance (ID21 and ID33) that are received, and generates the first correspondence based on the alarm filtering list and the identifier information of the first network slice instance, where FIG. 7 is a schematic diagram of the generated alarm filtering list, and FIG. 8 is a schematic diagram of the generated first correspondence.

It should be noted that, the first network slice instance may include a plurality of network function instances, and the first service entity may request, from the third service entity, identifier information of VNF instances for deploying all network function instances included in the plurality of network function instances, or certainly, may request only identifier information of a VNF instance for deploying some network function instances or a network function instance included in the plurality of network function instances. It is assumed that the first service entity requests, from the third service entity, only identifier information of a VNF instance for deploying a first network function instance and identifier information of a VNFC instance for deploying the first network function instance. The first network function instance is one of instances included in the plurality of network function instances, so that the third request may further carry identifier information of the first network function instance.

Figure 9:
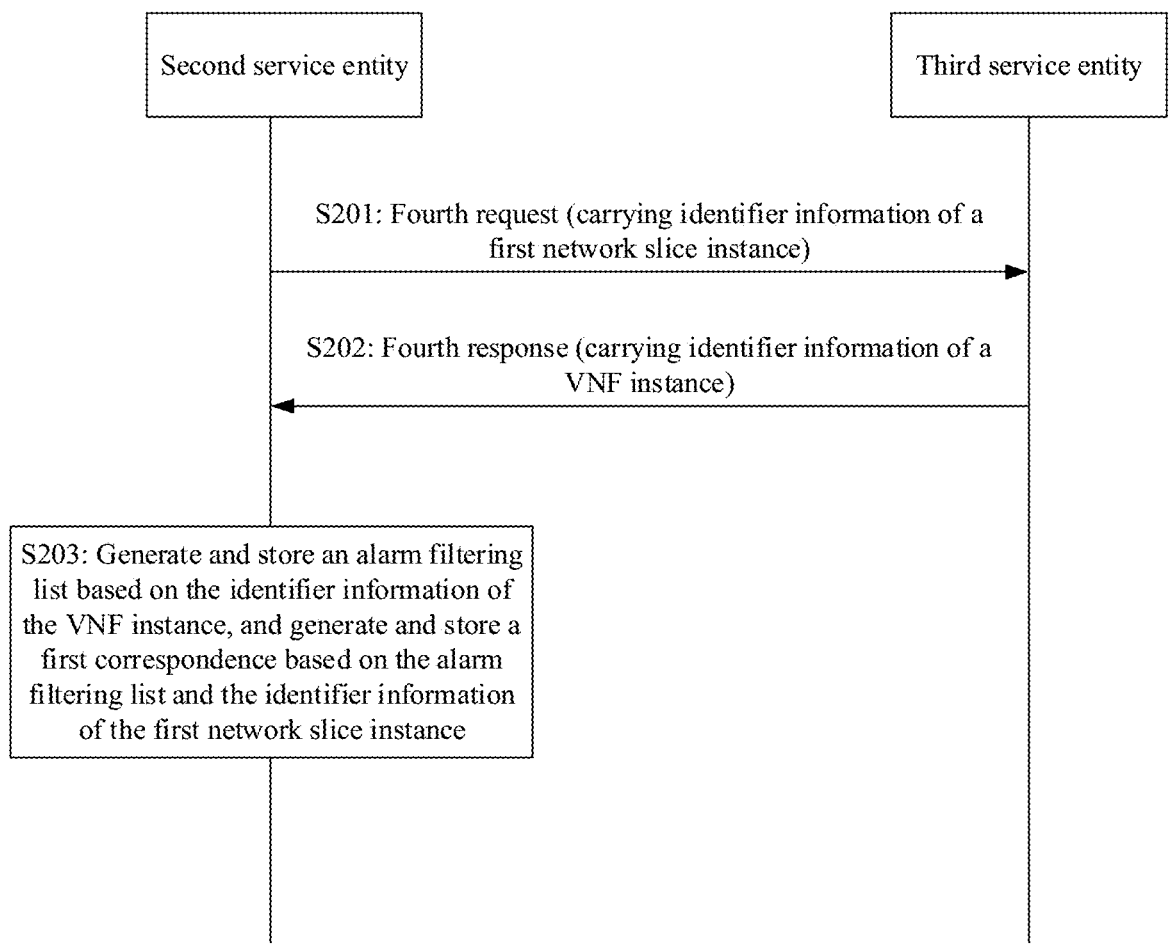
FIG. 9 is a flowchart of generating an alarm filtering list and a first correspondence according to an embodiment of this application.

In a possible implementation, the first service entity does not send the alarm filtering list and the first correspondence to the second service entity. In this implementation, the second service entity may generate the alarm filtering list and the first correspondence. An example in which the alarm filtering list includes only the identifier information of the VNF instance is used for description below. FIG. 9 is a flowchart of generating an alarm filtering list and a first correspondence according to an embodiment of this application. The method includes the following steps.

S201: A second service entity sends a fourth request to a third service entity. The fourth request carries identifier information of a first network slice instance, and the fourth request is used to request identifier information of a VNF instance included in the first network slice instance.

In this implementation, before sending the fourth request to the third service entity, the second service entity needs to obtain the identifier information of the first network slice instance. Optionally, the second service entity obtains the identifier information of the first network slice instance from a first service entity.

S202: The third service entity searches, based on the identifier information of the first network slice instance and prestored correspondences between identifier information of a plurality of network slice instances and identifier information of VNF instances, for identifier information of a VNF instance having a correspondence with the first network slice instance. For a specific execution step of S202, refer to the foregoing descriptions of the implementation in FIG. 6, and details are not described herein again.

S203: The second service entity receives a fourth response from the third service entity. The fourth response carries the identifier information of the VNF instance.

S204: The second service entity generates and stores an alarm filtering list based on the identifier information of the VNF instance, where there is a correspondence between the alarm filtering list and the first network slice instance, and generates and stores a first correspondence based on the alarm filtering list and the identifier information of the first network slice instance. The first correspondence is the correspondence between the alarm filtering list and the first network slice instance. For a specific execution step of S204, refer to the foregoing descriptions of the implementations in FIG. 7 and FIG. 8, and details are not described herein again.

In this embodiment of this application, after receiving a first response from the second service entity, the first service entity may further associate a virtualized resource alarm carried in the first response with the first network slice instance. An example in which the first service entity sends the identifier information of the VNF instance to the second service entity by using the alarm filtering list is used below, to describe association of the virtualized resource alarm with the first network slice instance by the first service entity.

In a possible implementation, after receiving the virtualized resource alarm from the second service entity, the first service entity associates, based on the identifier information that is of the VNF instance and that is carried in the virtualized resource alarm, the virtualized resource alarm with the prestored alarm filtering list including the identifier information of the VNF instance, and associates, based on the prestored first correspondence, the virtualized resource alarm with the first network slice instance having the correspondence with the alarm filtering list, where the first correspondence is the correspondence between the alarm filtering list and the first network slice instance.

In this embodiment of this application, the first service entity may associate the virtualized resource alarm with the first network slice instance; or certainly, the second service entity may associate the virtualized resource alarm with the first network slice instance.

In another possible implementation, after receiving a first request from the first service entity, the second service entity associates, based on the identifier information that is of the VNF instance and that is carried in the alarm filtering list, the virtualized resource alarm carrying the identifier information of the VNF instance with the alarm filtering list including the identifier information of the VNF instance, and associates, based on the first correspondence, the virtualized resource alarm with the first network slice instance having the correspondence with the alarm filtering list.

In this embodiment of this application, after associating the virtualized resource alarm with the first network slice instance, the second service entity may further send all or some virtualized resource alarms associated with the first network slice instance to the first service entity. The second service entity may actively send the virtualized resource alarm associated with the first network slice instance to the first service entity, or certainly, may send the virtualized resource alarm associated with the first network slice instance to the first service entity after receiving the request from the first service entity.

In an implementation, the second service entity receives a fifth request from the first service entity, where the fifth request carries the identifier information of the first network slice instance, and the fifth request is used to request alarm information of the virtualized resource alarm associated with the first network slice instance. The second service entity sends a fifth response to the first service entity, where the fifth response carries the alarm information of the virtualized resource alarm associated with the first network slice instance.

The alarm method provided in this application is described in detail below by using two specific examples.

Example 1

In this example, it is assumed that the alarm filtering list carries the identifier information of the VNF instance and identifier information of a VNFC instance, and it is assumed that the first service entity generates the alarm filtering list and the first correspondence by requesting the identifier information of the VNF instance and the identifier information of the VNFC instance from the third service entity.

Figure 10A:
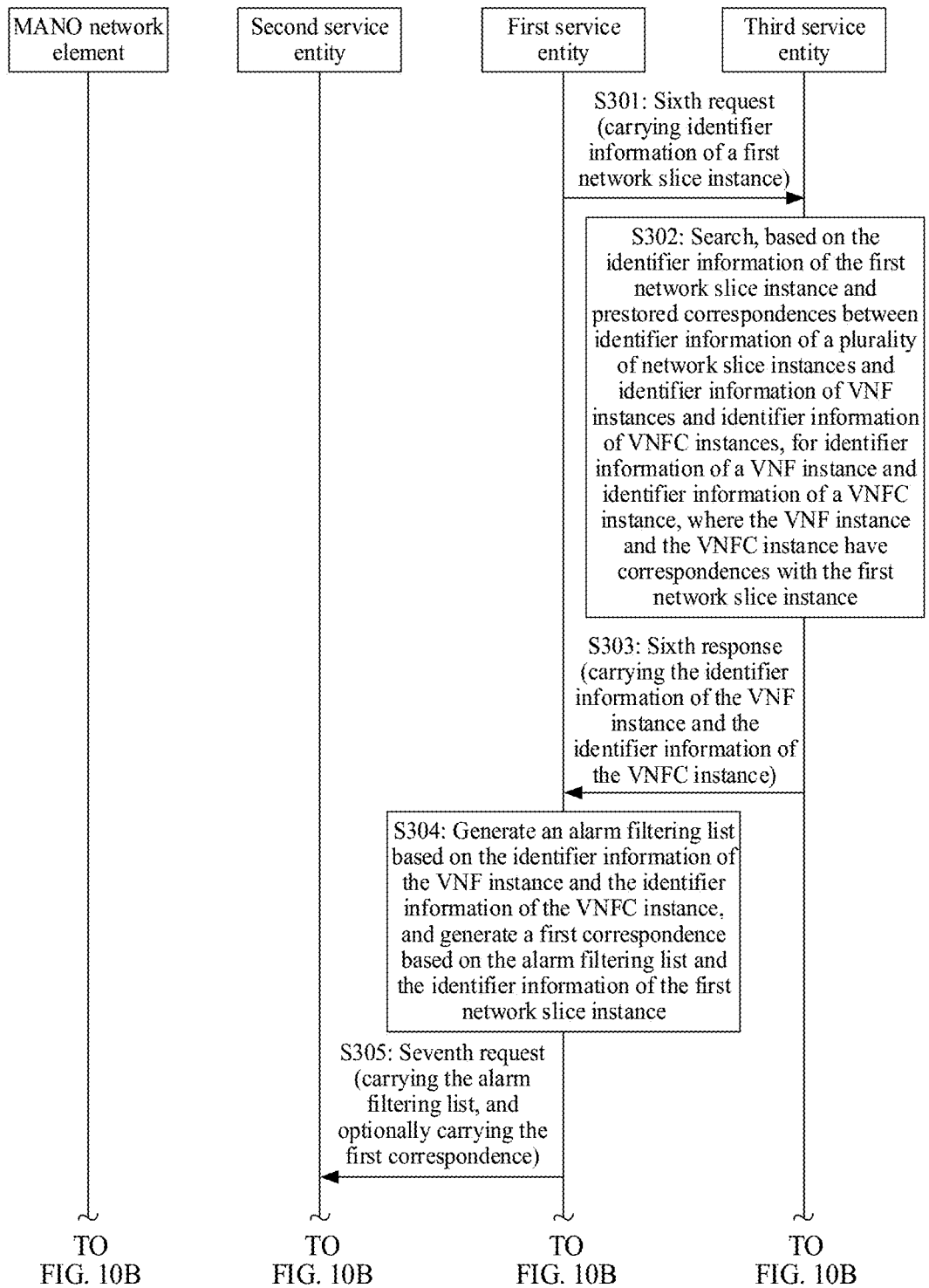
FIG. 10A and FIG. 10B are a flowchart of another alarm method according to an embodiment of this application.
Figure 10B:

FIG. 10A and FIG. 10B are a flowchart of another alarm method according to this application. The method includes the following steps.

S301: A first service entity sends a sixth request to a third service entity. The sixth request carries identifier information of a first network slice instance. The sixth request is used to request identifier information of a VNF instance and identifier information of a VNFC instance, where the VNF instance and the VNFC instance have correspondences with the first network slice instance. The VNFC instance is a VNFC instance that is included in the VNF instance and that belongs to the first network slice instance. The VNF instance having the correspondence with the first network slice instance is a VNF instance for deploying a network function instance included in the first network slice instance.

S302: After receiving the sixth request, the third service entity searches, based on the identifier information of the first network slice instance and prestored correspondences between identifier information of a plurality of network slice instances and identifier information of VNF instances and identifier information of VNFC instances, for the identifier information of the VNF instance and the identifier information of the VNFC instance, where the VNF instance and the VNFC instance have the correspondences with the first network slice instance. For a specific execution step of S302, refer to the foregoing descriptions of the implementation in FIG. 6, and details are not described herein again.

S303: The first service entity receives a sixth response from the third service entity. The sixth response carries the identifier information of the VNF instance and the identifier information of the VNFC instance, where the VNF instance and the VNFC instance have the correspondences with the first network slice instance.

S304: The first service entity generates an alarm filtering list based on the identifier information of the VNF instance and the identifier information of the VNFC instance, and generates a first correspondence based on the alarm filtering list and the identifier information of the first network slice instance. For a specific execution step of S304, refer to the foregoing descriptions of the implementations in FIG. 7 and FIG. 8, and details are not described herein again.

S305: The first service entity sends a seventh request to a second service entity. The seventh request carries the generated alarm filtering list.

Optionally, the seventh request may further carry the generated first correspondence.

Optionally, the seventh request may further include identifier information of a virtual machine for deploying the VNF instance or the VNFC instance and/or identifier information of a VDU for deploying the VNF instance or the VNFC instance. Certainly, the identifier information of the virtual machine and/or the identifier information of the VDU may alternatively be carried in the alarm filtering list.

S306: The second service entity receives at least one virtualized resource alarm from a MANO network element, where the at least one virtualized resource alarm may carry the identifier information of the VNF instance, or may carry the identifier information of the VNF instance and the identifier information of the VNFC instance.

S307: The second service entity associates, based on the identifier information of the VNF instance and the identifier information of the VNFC instance that are received and that are carried in the alarm filtering list, the virtualized resource alarm that is in the at least one virtualized resource alarm from the MANO network element and that carries the identifier information of the VNF instance and the identifier information of the VNFC instance with the alarm filtering list including the identifier information of the VNF instance, and associates, based on the first correspondence, the virtualized resource alarm with the first network slice instance having the correspondence with the alarm filtering list.

It should be noted that, S307 is an optional step. The second service entity may associate the virtualized resource alarm with the network slice instance, or the first service entity may associate the virtualized resource alarm with the network slice instance. If the second service entity performs S307, the seventh request in S305 includes the first correspondence.

S308: The second service entity sends a seventh response to the first service entity. The seventh response includes the virtualized resource alarm carrying the identifier information of the VNF instance and the identifier information of the VNFC instance.

In this embodiment of this application, after sending the alarm filtering list and the first correspondence to the second service entity, the first service entity may further request the second service entity to send a virtualized resource alarm carrying identifier information that is of all VNF instances and that is included in the alarm filtering list.

S309: The first service entity sends an eighth request to the second service entity. The eighth request carries the identifier information of the first network slice instance. The eighth request is used to request virtualized resource alarm carrying the identifier information of the VNF instance and the identifier information of the VNFC instance that are included in the alarm filtering list. Optionally, the eighth request may further carry the alarm filtering list and the first correspondence. If the second service entity already stores the alarm filtering list and the first correspondence that are sent by the first service entity, the eighth request may carry only the identifier information of the first network slice instance, so that the second service entity searches, based on the identifier information of the first network slice instance and the stored first correspondence, for the stored alarm filtering list having the correspondence with the first network slice instance, and determines, based on the alarm filtering list, the virtualized resource alarm carrying the identifier information of the VNF instance and the identifier information of the VNFC instance that are included in the alarm filtering list.

S310: The first service entity receives an eighth response from the second service entity. The eighth response includes the virtualized resource alarm carrying the identifier information of the VNF instance and the identifier information of the VNFC instance.

Example 2

In this example, it is assumed that the alarm filtering list carries the identifier information of the VNF instance and identifier information of a VNFC instance, and it is assumed that the second service entity generates the alarm filtering list and the first correspondence by requesting the identifier information of the VNF instance and the identifier information of the VNFC instance from the third service entity. The method is also applicable to a scenario in which the alarm filtering list carries only the identifier information of the VNF instance, but is not limited thereto.

Figure 11A:
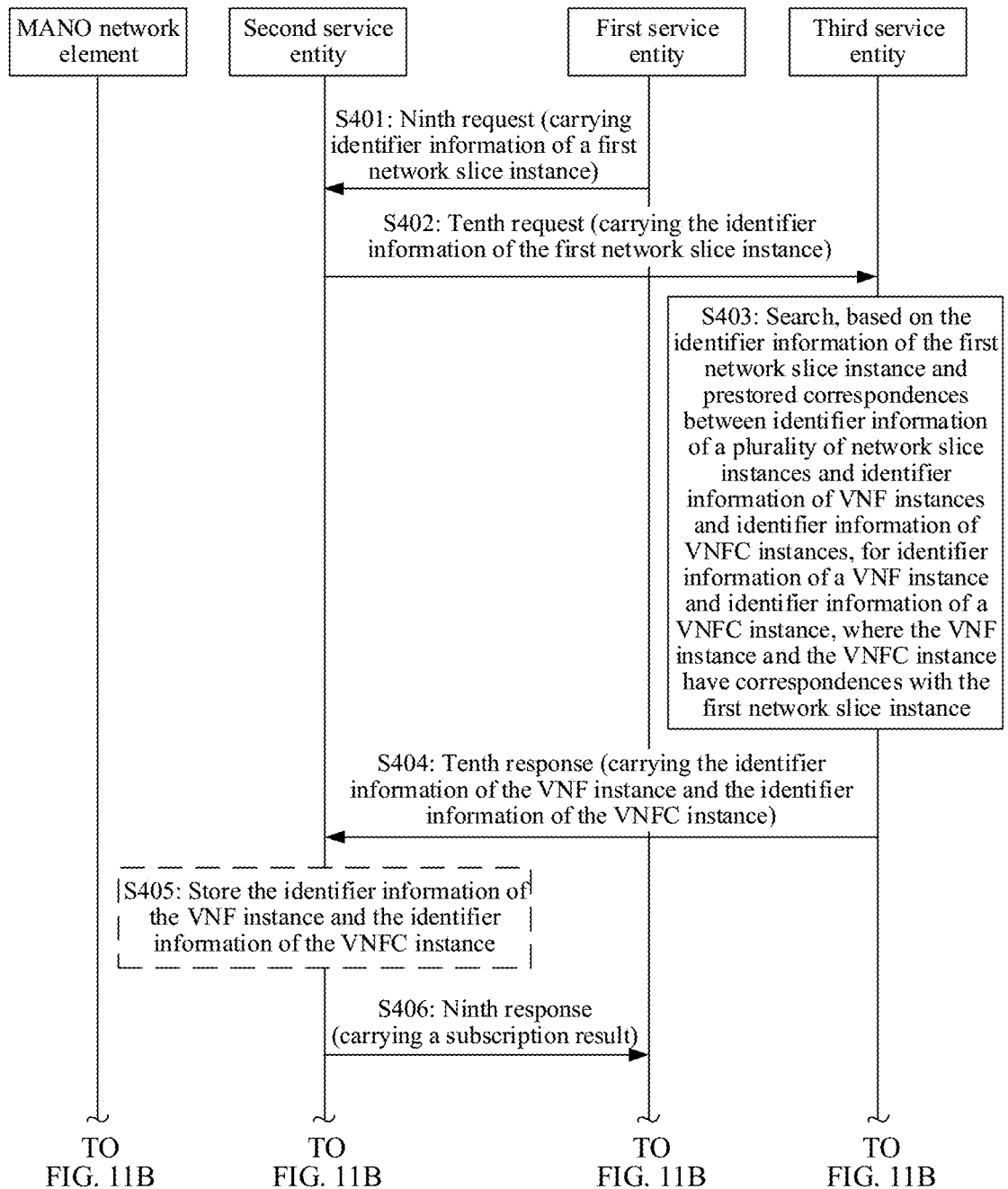
FIG. 11A and FIG. 11B are a flowchart of still another alarm method according to an embodiment of this application.
Figure 11B:
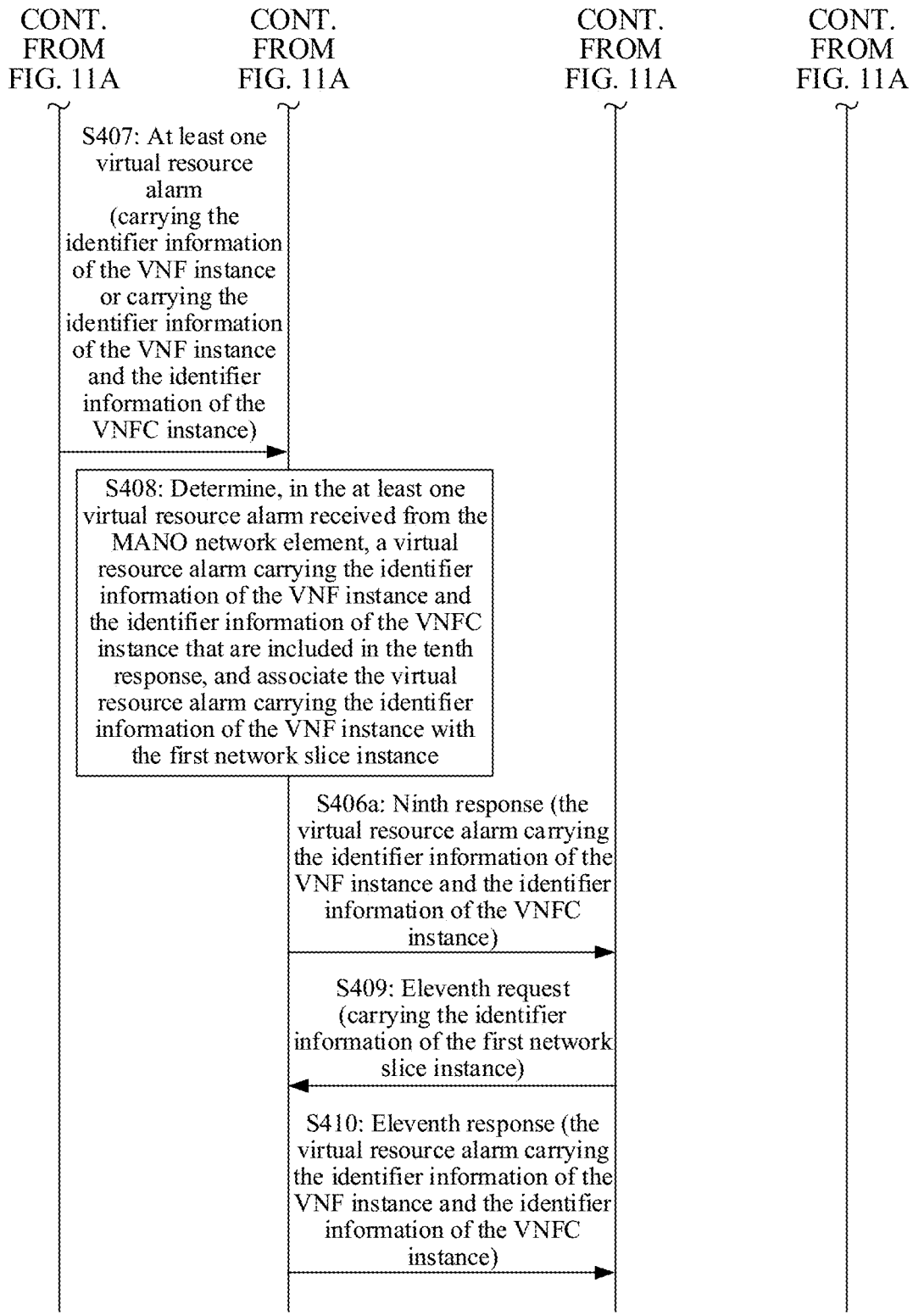

FIG. 11A and FIG. 11B are a flowchart of still another alarm method according to this application. The method includes the following steps.

S401: A second service entity receives a ninth request from a first service entity. The ninth request includes identifier information of a first network slice instance, and the ninth request is used to request a virtualized resource alarm associated with the first network slice instance.

S402: The second service entity sends a tenth request to a third service entity. The tenth request carries the identifier information of the first network slice instance. The tenth request is used to request identifier information of a VNF instance and identifier information of a VNFC instance, where the VNF instance and the VNFC instance belong to the first network slice instance. The VNF instance is used to deploy a network function instance belonging to the first network slice instance. The VNFC instance is a VNFC instance that is included in the VNF instance and that belongs to the first network slice instance.

Optionally, the tenth request may be further used to request identifier information of a virtual machine for deploying the VNF instance or the VNFC instance and/or identifier information of a VDU for deploying the VNF instance or the VNFC instance.

It should be noted that, S401 and S402 are not performed in sequence, and S401 may be performed first, or S402 may be performed first.

S403: After receiving the tenth request, the third service entity searches, based on the identifier information of the first network slice instance and prestored correspondences between identifier information of a plurality of network slice instances and identifier information of VNF instances and identifier information of VNFC instances, for identifier information of a VNF instance and identifier information of a VNFC instance, where the VNF instance and the VNFC instance have correspondences with the first network slice instance. For a specific execution step of S403, refer to the foregoing descriptions of the implementation in FIG. 6, and details are not described herein again.

S404: The second service entity receives a tenth response from the third service entity. The tenth response carries the identifier information of the VNF instance and the identifier information of the VNFC instance, where the VNF instance and the VNFC instance have the correspondences with the first network slice instance.

S405: The second service entity stores the identifier information of the VNF instance and the identifier information of the VNFC instance. S405 is an optional step.

S406: The second service entity sends a ninth response to a first service entity. The ninth response may carry a subscription result, and the subscription result may include a subscription success or a subscription failure. The subscription success is used to instruct the second service entity to send the virtualized resource alarm associated with the first network slice instance to the first service entity after the second service entity receives the virtualized resource alarm. On the contrary, the subscription failure is used to indicate that the first service entity fails to request the virtualized resource alarm, and may carry information such as a failure cause value.

S407: The second service entity receives at least one virtualized resource alarm from a MANO network element, where the at least one virtualized resource alarm may carry the identifier information of the VNF instance, or may carry the identifier information of the VNF instance and the identifier information of the VNFC instance.

S408: The second service entity determines, in the at least one virtualized resource alarm received from the MANO network element, a virtualized resource alarm carrying the identifier information of the VNF instance and the identifier information of the VNFC instance that are included in the tenth response, and associates the virtualized resource alarm carrying the identifier information of the VNF instance with the first network slice instance.

S406a: The second service entity sends the ninth response to the first service entity. The ninth response includes the virtualized resource alarm associated with the first network slice instance.

S409: The first service entity sends an eleventh request to the second service entity. The eleventh request carries the identifier information of the first network slice instance. The eleventh request is used to request the virtualized resource alarm associated with the first network slice instance.

S410: The first service entity receives an eleventh response from the second service entity. The eleventh response carries the virtualized resource alarm associated with the first network slice instance.

In the second example, the second service entity may alternatively perform S402 to S405 a plurality of times in advance, to obtain, one by one for all known network slice instances, identifier information of VNF instances and identifier information of VNFC instances, where the VNF instances and the VNFC instances have correspondences with the network slice instances. After the second service entity receives the ninth request sent by the first service entity, the second service entity determines that the identifier information of the VNF instance and the identifier information of the VNFC instance are already stored, where the VNF instance and the VNFC instance have the correspondences with the first network slice instance, and directly returns the ninth response in S406 or S406a.

The solutions provided by this application are described above mainly from a perspective of interaction between the network elements. It may be understood that, to implement the foregoing functions, the network elements include corresponding hardware structures and/or software modules for performing the functions. A person skilled in the art should be easily aware that units and algorithm steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
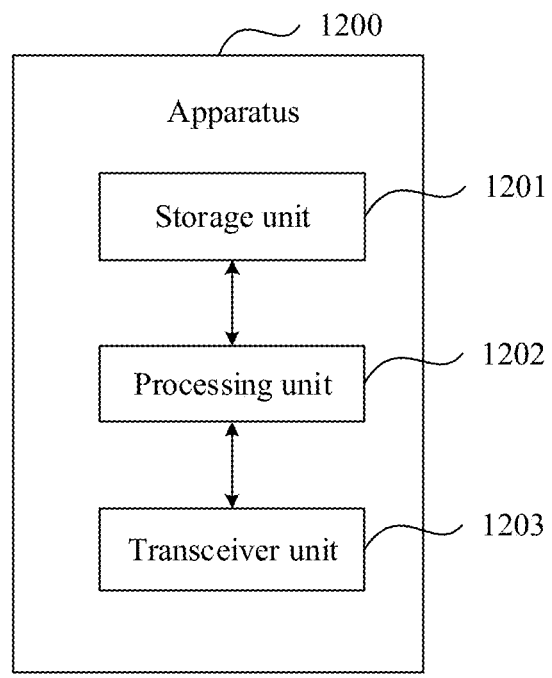
FIG. 12 is a schematic structural diagram of an alarm apparatus according to an embodiment of this application.

When an integrated unit is used, FIG. 12 is a possible example block diagram of an apparatus 1200 in an embodiment of this application. The apparatus 1200 may exist in a form of software, or may be a first service entity, a second service entity, or a third service entity, or may be a chip in a first service entity, a chip in a second service entity, or a chip in a third service entity. The apparatus 1200 includes a processing unit 1202 and a transceiver unit 1203. The processing unit 1202 is configured to control and manage an action of the apparatus 1200. For example, when the apparatus 1200 is the first service entity, the processing unit 1202 is configured to: associate a virtualized resource alarm with a first network slice instance, and perform a technical process such as S304 in FIG. 10A and FIG. 10B. When the apparatus 1200 is the second service entity, the processing unit 1202 is configured to perform technical processes such as S102 in FIG. 4, S203 in FIG. 9, S307 in FIG. 10A and FIG. 10B, and S405 and S408 in FIG. 11A and FIG. 11B. When the apparatus 1200 is the third service entity, the processing unit 1202 is configured to perform technical processes such as S302 in FIG. 10A and FIG. 10B and S403 in FIG. 11A and FIG. 11B. The transceiver unit 1203 is configured to support the apparatus 1200 in communicating with another network entity. When the apparatus 1200 is the first service entity, the transceiver unit 1203 may be configured to support the apparatus 1200 in performing technical processes such as S101 and S103 in FIG. 4, S301, S303, S305, S308, S309, and S310 in FIG. 10A and FIG. 10B, and S401, S406, S406a, S409, and S410 in FIG. 11A and FIG. 11B. When the apparatus 1200 is the second service entity, the transceiver unit 1203 may be configured to support the apparatus 1200 in performing technical processes such as S101 and S103 in FIGS. 4, S201 and S202 in FIG. 9, and S305, S306, S308, S309, and S310 in FIG. 10A and FIG. 10B, and S401, S402, S404, S406, S406a, S407, S409, and S410 in FIG. 11A and FIG. 11B. When the apparatus 1200 is the third service entity, the transceiver unit 1203 may be configured to support the apparatus 1200 in performing technical processes such as S201 and S202 in FIGS. 9, S301 and S303 in FIG. 10A and FIG. 10B, and S402 and S404 in FIG. 11A and FIG. 11B. The apparatus 1200 may further include a storage unit 1201, configured to store program code and data of the apparatus 1200.

The processing unit 1202 may be a processor or a controller, such as a general-purpose central processing unit (central processing unit, CPU), a general-purpose processor, a digital signal processor (digital signal processing, DSP), an application-specific integrated circuit (application specific integrated circuits, ASIC), a field programmable gate array (field programmable gate array, FPGA), or another programmable logical device, a transistor logical device, a hardware component, or a combination thereof. The processing unit 1202 may implement or execute various example logical blocks, modules, and circuits described with reference to content disclosed in this application. Alternatively, the processor may be a combination for implementing a computing function, for example, a combination of one or more microprocessors or a combination of a DSP and a microprocessor. The transceiver unit 1203 may be a communications interface, a transceiver, a transceiver circuit, or the like. The storage unit 1201 may be a memory.

Figure 13:
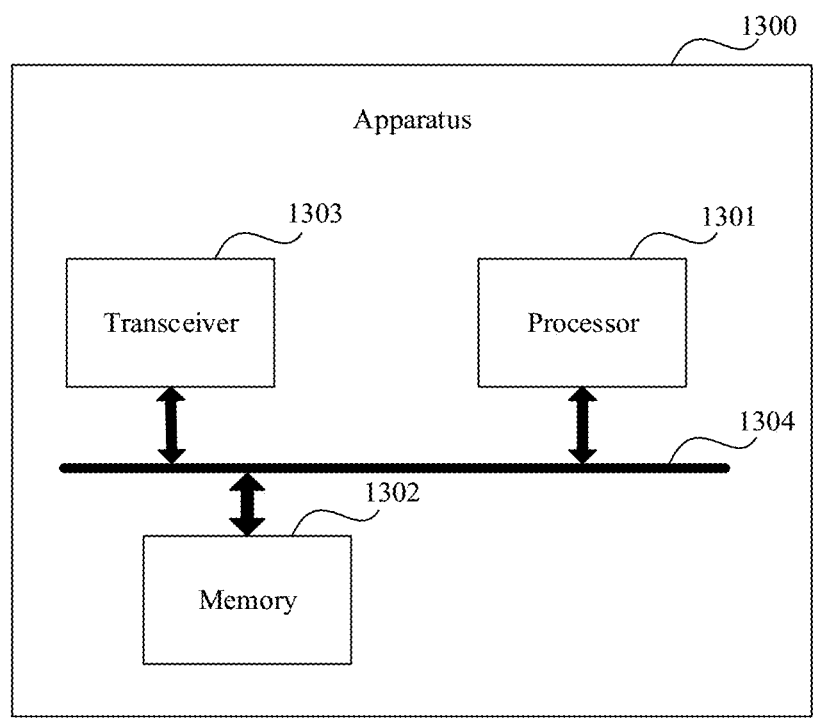
FIG. 13 is a schematic structural diagram of another alarm apparatus according to an embodiment of this application.

When the processing unit 1202 is a processor, the transceiver unit 1203 is a transceiver, and the storage unit 1201 is a memory, the apparatus 1200 in this embodiment of this application may be an apparatus shown in FIG. 13.

FIG. 13 is a possible schematic diagram of a logical structure of the apparatus in the foregoing embodiment according to an embodiment of this application. As shown in FIG. 13, the apparatus 1300 may include at least one processor 1301. In this embodiment of this application, the processor 1301 is configured to control and manage an action of the apparatus. Optionally, the apparatus may further include a memory 1302 and a transceiver 1303. The processor 1301, the transceiver 1303, and the memory 1302 may be connected to each other or may be connected to each other by using a bus 1304. The memory 1302 is configured to store code and data of the apparatus. The transceiver 1303 is configured to support communication of the apparatus.

The components of the apparatus are described in detail below:

The processor 1301 is a control center of the apparatus, and may be a processor, or may be a collective name of a plurality of processing elements. For example, the processor 1301 is a CPU, or may be implemented by using an ASIC, or may be one or more integrated circuits configured to implement the embodiments of this application, for example, one or more DSPs or one or more FPGAs.

The processor 1301 may perform various functions of the apparatus 1300 by running or executing a software program stored in the memory 1302 and invoking data stored in the memory 1302.

The memory 1302 may be a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD- ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 1302 is not limited thereto. The memory 1302 may exist independently and is connected to the processor 1301 by using a communications bus 1304. Alternatively, the memory 1302 may be integrated with the processor 1301.

The transceiver 1303 is configured to communicate with another node such as a first network element by using any apparatus such as a transceiver, and may be further configured to communicate with a communications network such as the Ethernet, a radio access network (radio access network, RAN), or a wireless local area network (Wireless Local Area Networks, WLAN). The transceiver 1203 may include a receiving unit for implementing a receiving function and a sending unit for implementing a sending function.

The communications bus 1304 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, or the like. For ease of representation, only one thick line is used to represent the bus in FIG. 13, but this does not mean that there is only one bus or only one type of bus.

A structure of the device shown in FIG. 13 does not constitute a limitation on the apparatus. The apparatus may include more or fewer components than those shown in the figure, or combine some components, or have different component arrangements.

An embodiment of this application further provides a computer storage medium, configured to store a computer software instruction used by the apparatuses shown in FIG. 12 and FIG. 13, where the computer software instruction includes program code designed to perform the foregoing method embodiment. The foregoing method can be implemented by executing the stored program code.

An embodiment of this application further provides a computer program product. The computer program product includes a computer software instruction, where the computer software instruction may be loaded by a processor to implement the method in the foregoing method embodiment.

An embodiment of this application further provides a chip. The chip includes a processor and a transceiver component. Optionally, the chip further includes a storage unit that may be configured to perform the method in the foregoing embodiment of this application.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instruction is loaded and executed on a computer, some or all of the procedures or functions according to the embodiments of this application are generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may be integrated into a processor. The processor and the storage medium may be disposed in an ASIC, and the ASIC may be disposed in a terminal device. Optionally, the processor and the storage medium may alternatively be disposed in different components of a terminal device.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more procedures in the flowcharts and/or in one or more blocks in the block diagrams.

Although this application is described with reference to specific features and the embodiments thereof, apparently, various modifications and combinations may be made to them without departing from the spirit and scope of this application. Correspondingly, this specification and the accompanying drawings are merely examples of descriptions of this application defined by the appended claims, and are considered as any or all of modifications, variations, combinations, or equivalents that cover the scope of this application. Obviously, a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. A method, comprising:
sending, by a first service entity configured to manage a network slice instance, a first request to a second service entity configured to manage an alarm of a network function instance, wherein the first request requests a virtualized resource alarm, wherein the first request comprises an alarm filtering list, wherein the alarm filtering list comprises identifier information of one or more virtual network function (VNF) instances, wherein the one or more VNF instances corresponds to a first network slice instance managed by the first service entity, and wherein the alarm filtering list corresponds to the first network slice instance;
receiving, by the first service entity, a first response from the second service entity, wherein the first response comprises the virtualized resource alarm, and wherein the virtualized resource alarm comprises the identifier information of the VNF instance;
associating, by the first service entity based on the identifier information of the VNF instance, the virtualized resource alarm with the alarm filtering list carrying the identifier information of the VNF instance; and
associating, by the first service entity based on a first correspondence between the alarm filtering list and the first network slice instance, the virtualized resource alarm with the first network slice instance, wherein the first network slice instance is one of a plurality of network slice instances managed by the first service entity.

2. The method of claim 1, wherein the alarm filtering list and the first correspondence are prestored in the first service entity.

3. The method of claim 1, wherein the first request further comprises the first correspondence, and wherein after sending the first request to the second service entity, the method further comprises:
sending, by the first service entity, a second request to the second service entity, wherein the second request comprises identifier information of the first network slice instance, and wherein the second request requests the virtualized resource alarm; and
receiving, by the first service entity, a second response from the second service entity, wherein the second response comprises the virtualized resource alarm, and wherein the virtualized resource alarm comprises the identifier information of the VNF instance.

4. The method of claim 1, wherein the first request further comprises identifier information of a virtual network function component (VNFC) instance, wherein the VNFC instance is in the VNF instance and belongs to the first network slice instance, and wherein the virtualized resource alarm comprises the identifier information of the VNF instance and the identifier information of the VNFC instance.

5. The method of claim 4, wherein before sending the first request to the second service entity, the method further comprises:

sending, by the first service entity, a third request to a third service entity, wherein the third request comprises identifier information of the first network slice instance, and wherein the third request requests the identifier information of the VNF instance corresponding to the first network slice instance;
receiving, by the first service entity, a third response from the third service entity, wherein the third response comprises the identifier information of the VNF instance, and wherein the VNF instance is for deploying the network function instance in the first network slice instance;
generating, by the first service entity, the alarm filtering list based on the identifier information of the VNF instance; and
generating the first correspondence based on the alarm filtering list and the identifier information of the first network slice instance.

6. A method, comprising:
sending, by a first service entity configured to manage a network slice instance, a first request to a second service entity configured to manage an alarm of a network function instance, wherein the first request requests a virtualized resource alarm, wherein the first request comprises an alarm filtering list, wherein the alarm filtering list comprises identifier information of one or more virtual network function (VNF) instances, wherein the one or more VNF instances corresponds to a first network slice instance managed by the first service entity, and wherein the alarm filtering list corresponds to the first network slice instance;
receiving, by the second service entity, the first request;
identifying, by the second service entity based on the first request, the virtualized resource alarm from at least one virtualized resource alarm received from a management and orchestration (MANO) network element, wherein the virtualized resource alarm comprises the identifier information of the VNF instance;
sending, by the second service entity, a first response to the first service entity, wherein the first response comprises the virtualized resource alarm;
receiving, by the first service entity, the first response from the second service entity;
associating, by the first service entity based on the identifier information of the VNF instance, the virtualized resource alarm with the alarm filtering list carrying the identifier information of the VNF instance; and
associating, based on a first correspondence between the alarm filtering list and the first network slice instance, the virtualized resource alarm with the first network slice instance, wherein the first network slice instance is one of a plurality of network slice instances managed by the first service entity.

7. The method of claim 6, wherein the alarm filtering list and the first correspondence are prestored in the first service entity.

8. The method of claim 6, wherein the first request further comprises the first correspondence, and wherein after sending the first request to the second service entity, the method further comprises:
sending, by the first service entity, a second request to the second service entity, wherein the second request comprises identifier information of the first network slice instance, and wherein the second request requests the virtualized resource alarm;
searching, by the second service entity based on the identifier information of the first network slice instance and the first correspondence, for the alarm filtering list corresponding to the first network slice instance;

identifying, based on the alarm filtering list, the virtualized resource alarm;

sending, by the second service entity, a second response to the first service entity, wherein the second response comprises the virtualized resource alarm; and receiving, by the first service entity, the second response from the second service entity.

9. The method of claim 6, wherein the first request further comprises identifier information of a virtual network function component (VNFC) instance, wherein the VNFC instance is in the VNF instance and belongs to the first network slice instance, and wherein the virtualized resource alarm comprises the identifier information of the VNF instance and the identifier information of the VNFC instance.

10. The method of claim 9, wherein before sending the first request to the second service entity, the method further comprises:
    sending, by the first service entity, a third request to a third service entity, wherein the third request comprises identifier information of the first network slice instance, and wherein the third request requests the identifier information of the VNF instance corresponding to the first network slice instance;
    sending, by the third service entity, a third response to the first service entity, wherein the third response comprises the identifier information of the VNF instance, and wherein the VNF instance is for deploying the network function instance in the first network slice instance;
    generating, by the first service entity, the alarm filtering list based on the identifier information of the VNF instance; and
    generating the first correspondence based on the alarm filtering list and the identifier information of the first network slice instance.

11. The method of claim 10, wherein the identifier information of the VNFC instance is carried in the alarm filtering list, wherein the third request further requests the identifier information of the VNFC instance, wherein the third response further comprises the identifier information of the VNFC instance, wherein the first service entity generates the alarm filtering list based on the identifier information of the VNF instance and the identifier information of the VNFC instance, and wherein the first service entity generates the first correspondence based on the alarm filtering list and the identifier information of the first network slice instance.

12. A system, comprising:
    a first service entity configured to:
        send a first request for a virtualized resource alarm, wherein the first request comprises an alarm filtering list, wherein the alarm filtering list comprises identifier information of one or more virtual network function (VNF) instances, wherein the one or more VNF instances corresponds to a first network slice instance managed by the first service entity, and wherein the alarm filtering list corresponds to the first network slice instance;
        associate, based on the identifier information of the VNF instance, the virtualized resource alarm with the alarm filtering list carrying the identifier information of the VNF instance; and
        associate, based on a first correspondence between the alarm filtering list and the first network slice instance, the virtualized resource alarm with the first network slice instance, wherein the first network slice instance is one of a plurality of network slice instances managed by the first service entity; and
    a second service entity configured to manage an alarm of a network function instance, wherein the second service entity is further configured to:
        receive the first request from the first service entity;
        identify, based on the first request, the virtualized resource alarm among at least one virtualized resource alarm received from a management and orchestration (MANO) network element, wherein the virtualized resource alarm comprises the identifier information of the VNF instance; and
        send a first response to the first service entity, wherein the first response comprises the virtualized resource alarm.

13. The system of claim 12, wherein the alarm filtering list and the first correspondence are prestored in the first service entity.

14. The system of claim 12, wherein the first request further comprises the first correspondence, wherein the first service entity is further configured to send, after sending the first request to the second service entity, a second request to the second service entity, wherein the second request comprises identifier information of the first network slice instance, wherein the second request requests the virtualized resource alarm, wherein the second service entity is further configured to:
    search, based on the identifier information of the first network slice instance and the first correspondence, for the alarm filtering list corresponding to the first network slice instance;
    identify, based on the alarm filtering list, the virtualized resource alarm; and
    send a second response to the first service entity, wherein the second response comprises the virtualized resource alarm, and
wherein the first service entity is further configured to:
    receive the second response from the second service entity; and
    manage, based on the virtualized resource alarm, a fault of the first network slice instance.

15. The system of claim 12, wherein the first request further comprises identifier information of a virtual network function component (VNFC) instance, wherein the VNFC instance is in the VNF instance and belongs to the first network slice instance, and wherein the virtualized resource alarm comprises the identifier information of the VNF instance and the identifier information of the VNFC instance.

16. The system of claim 15, further comprising a third service entity, wherein the first service entity is further configured to send a third request to the third service entity before sending the first request to the second service entity, wherein the third request comprises the identifier information of the first network slice instance, wherein the third request requests the identifier information of the VNF instance corresponding to the first network slice instance, wherein the third service entity is configured to send a third response to the first service entity, wherein the third response comprises the identifier information of the VNF instance, wherein the VNF instance is for deploying the network function instance in the first network slice instance, and wherein the first service entity is further configured to:
    generate the alarm filtering list based on the identifier information of the VNF instance; and generate the first correspondence based on the alarm filtering list and the identifier information of the first network slice instance.

17. The system of claim 16, wherein the identifier information of the VNFC instance is carried in the alarm filtering list, wherein the third request further requests the identifier information of the VNFC instance, wherein the third response further comprises the identifier information of the VNFC instance, wherein the first service entity generates the alarm filtering list based on the identifier information of the VNF instance and the identifier information of the VNFC instance, and wherein the first service entity generates the first correspondence based on the alarm filtering list and the identifier information of the first network slice instance.

18. The method of claim 1, wherein the alarm filtering list further comprises second identifier information of a second VNF instance and third identifier information of a third VNF instance, and wherein the first correspondence associates the first network slice instance with the second identifier information of the second VNF instance and the third identifier information of the third VNF instance.

19. The method of claim 6, wherein the alarm filtering list further comprises second identifier information of a second VNF instance and third identifier information of a third VNF instance, and wherein the first correspondence associates the first network slice instance with the second identifier information of the second VNF instance and the third identifier information of the third VNF instance.

20. The system of claim 12, wherein the alarm filtering list further comprises second identifier information of a second VNF instance and third identifier information of a third VNF instance, and wherein the first correspondence associates the first network slice instance with the second identifier information of the second VNF instance and the third identifier information of the third VNF instance.

* * * * *

UNITED STATES PATENT AND TRADEMARK OFFICE
CERTIFICATE OF CORRECTION

| | | |
|---|---|---|
| PATENT NO. | : 12,218,793 B2 | Page 1 of 1 |
| APPLICATION NO. | : 17/122431 | |
| DATED | : February 4, 2025 | |
| INVENTOR(S) | : Zhuoming Li | |

It is certified that error appears in the above-identified patent and that said Letters Patent is hereby corrected as shown below:

On the Title Page

Page 2 - Item (56) FOREIGN PATENT DOCUMENTS: IN 108024256 A 5/2018 should read CN 108024256 A 5/2018

Signed and Sealed this
First Day of April, 2025

Coke Morgan Stewart
*Acting Director of the United States Patent and Trademark Office*